(12) United States Patent
Choi et al.

(10) Patent No.: US 11,327,595 B2
(45) Date of Patent: May 10, 2022

(54) ELECTRONIC DEVICE AND METHOD FOR CONTROLLING MOTION

(71) Applicant: Samsung Electronics Co., Ltd., Suwon-si (KR)

(72) Inventors: Seung-Min Choi, Seongnam-si (KR); Kyu-Hong Kim, Yongin-si (KR); So-Young Kim, Suwon-si (KR); Doo-Suk Kang, Suwon-si (KR); Geon-Soo Kim, Suwon-si (KR); Yo-Han Lee, Seongnam-si (KR); Bo-Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 16/330,572

(22) PCT Filed: Sep. 5, 2017

(86) PCT No.: PCT/KR2017/009702
§ 371 (c)(1),
(2) Date: Mar. 5, 2019

(87) PCT Pub. No.: WO2018/044140
PCT Pub. Date: Mar. 8, 2018

(65) Prior Publication Data
US 2021/0278947 A1    Sep. 9, 2021

(30) Foreign Application Priority Data

Sep. 5, 2016    (KR) .......................... 10-2016-0113864

(51) Int. Cl.
*G06F 3/041*    (2006.01)
*G06F 3/0488*    (2022.01)

(52) U.S. Cl.
CPC ........ *G06F 3/04146* (2019.05); *G06F 3/0412* (2013.01); *G06F 3/0488* (2013.01); *G06F 2203/04105* (2013.01)

(58) Field of Classification Search
CPC .. G06F 3/04146; G06F 3/0412; G06F 3/0488; G06F 2203/04105; G06F 3/00;
(Continued)

(56) References Cited

U.S. PATENT DOCUMENTS

2010/0225604 A1* 9/2010 Homma .................. G06F 3/044
345/173
2011/0141052 A1    6/2011 Bernstein et al.
(Continued)

FOREIGN PATENT DOCUMENTS

JP    2016-143410 A    8/2016
KR    2012-0023339 A    3/2012
(Continued)

*Primary Examiner* — Temesghen Ghebretinsae
*Assistant Examiner* — Ivelisse Martinez Quiles
(74) *Attorney, Agent, or Firm* — Jefferson IP Law, LLP

(57) ABSTRACT

An electronic device according to various embodiments of the present invention comprises: a housing including a first surface facing a first direction and a second surface facing a second direction opposite to the first direction; a touch screen display disposed between the first surface and the second surface and exposed through the first surface; a pressure sensor disposed between the first surface and the second surface and configured to sense at least one pressure by an external object on the touch screen display; at least one processor electrically connected to the touch screen display and the pressure sensor; and a memory electrically connected to the processor, wherein the memory may store instructions which cause the processor to receive, from the pressure sensor, data indicating pressure by a user or the external object on the touch screen display, determine a rate of pressure change corresponding to a change of the pressure (Continued)

per unit time, and call a function on the basis of at least a part of at least one between a value of the pressure and the rate of pressure change, during execution. Other embodiments may be possible.

13 Claims, 16 Drawing Sheets

(58) Field of Classification Search
CPC .......... G06F 3/01; G06F 3/0346; G06F 3/041; G06F 2203/04106
See application file for complete search history.

(56) References Cited

U.S. PATENT DOCUMENTS

| | | | |
|---|---|---|---|
| 2012/0105358 A1* | 5/2012 | Momeyer | G06F 3/04883 345/174 |
| 2012/0319966 A1 | 12/2012 | Reynolds | |
| 2013/0063389 A1 | 3/2013 | Moore | |
| 2014/0168139 A1 | 6/2014 | Ku | |
| 2015/0116205 A1* | 4/2015 | Westerman | G06F 3/044 345/156 |
| 2015/0233714 A1* | 8/2015 | Kim | G01C 17/38 33/356 |
| 2016/0224171 A1 | 8/2016 | Kim et al. | |

FOREIGN PATENT DOCUMENTS

| | | |
|---|---|---|
| KR | 10-2014-0023440 A | 2/2014 |
| KR | 10-2014-0046479 A | 4/2014 |
| KR | 10-2014-0078922 A | 6/2014 |
| KR | 10-2014-0089224 A | 7/2014 |
| KR | 2015-0102359 A | 9/2015 |

* cited by examiner

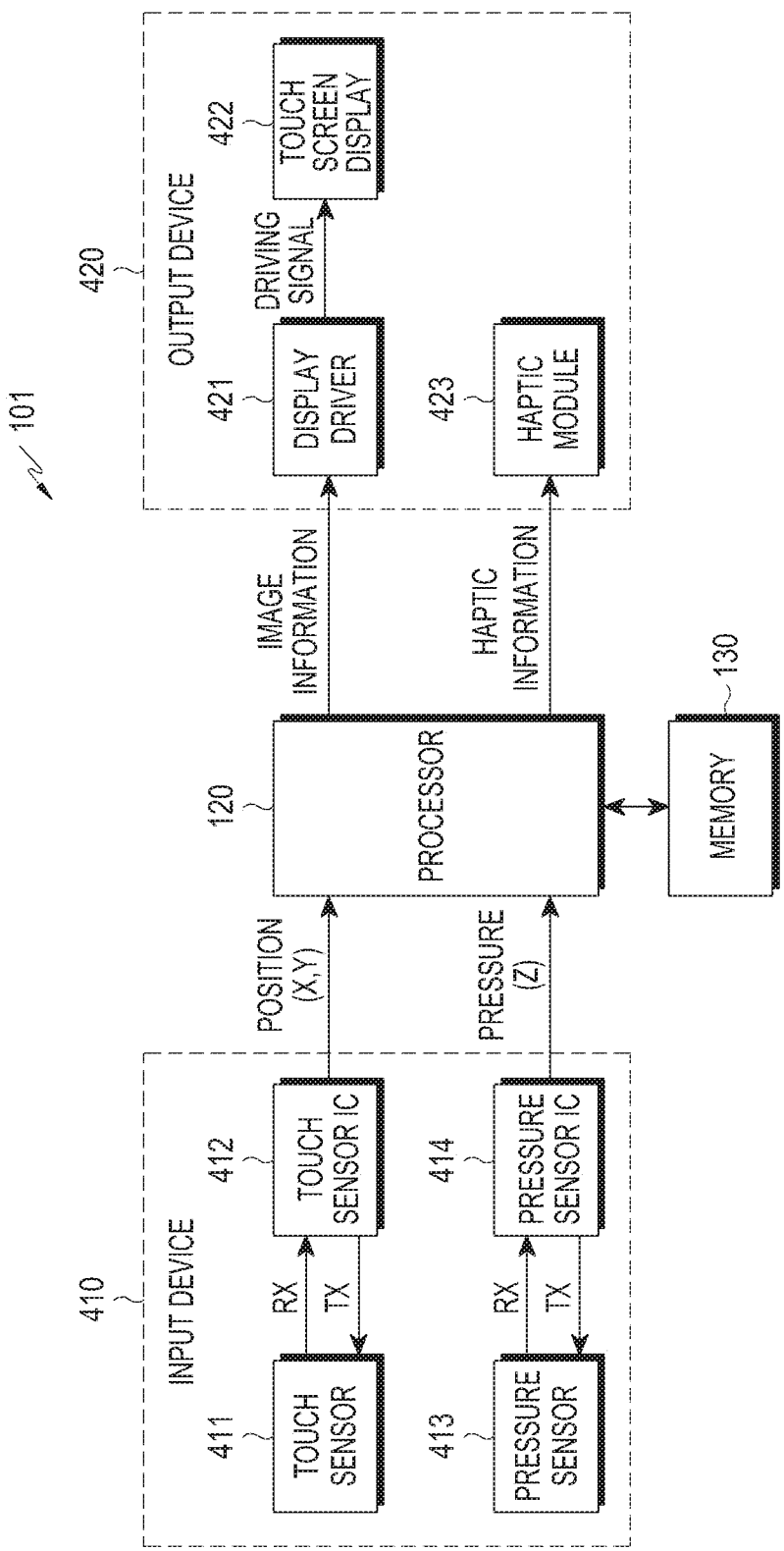

ELECTRONIC DEVICE AND METHOD FOR CONTROLLING MOTION

CROSS-REFERENCE TO RELATED APPLICATION(S)

This application is a U.S. National Stage application under 35 U.S.C. § 371 of an International application number PCT/KR2017/009702, filed on Sep. 5, 2017, which is based on and claimed priority to a Korean Patent Application number 10-2016-0113864, filed on Sep. 5, 2016, in Korean Intellectual Property Office, the disclosure of which is incorporated herein by reference herein in its entirety.

BACKGROUND ART

1. Field

The present disclosure relates to an electronic device, and more particularly, to an electronic device and method for controlling an operation.

2. Description of Related Art

Recently, various services and additional functions provided in electronic devices have expanded gradually. To improve the utility value of electronic devices and to meet various user demands, common carriers or electronic device manufacturers competitively develop electronic devices to provide various functions and to differentiate electronic devices from electronic devices of other companies.

Along with advances in the technology of the electronic devices, various forms of electronic products have been developed and spread, and efforts have been continuously made to provide various services using user's pressure inputs as well as touch inputs.

SUMMARY

To control an operation of an electronic device, a user may use a touch input or a pressure input. The electronic device may use both the touch input and the pressure input, and may selectively receive the touch input or the pressure input according to a user's intention in order to control an operation of the electronic device intended by the user. When there are a plurality of inputs, the user may have a difficulty in delivering an intended input for controlling the electronic device.

Various embodiments of the present disclosure may provide an electronic device and a pressure input method which sense a pressure variation and use the pressure variation.

According to various embodiments of the present disclosure, an electronic device includes a housing comprising a first surface directed in a first direction and a second surface directed in a second direction that is opposite to the first direction, a touch screen display located between the first surface and the second surface and exposed through the first surface, a pressure sensor located between the first surface and the second surface and configured to sense at least one pressure by an external object to the touch screen display, at least one processor electrically connected with the touch screen display and the pressure sensor, and a memory electrically connected with the processor, wherein the memory stores instructions that cause, when executed, the processor to receive from the pressure sensor, data indicating pressure by a user or the external object to the touch screen display, to determine a pressure change rate indicating a change of the pressure per unit time, and to call a function based on at least a part of at least one of a value of the pressure or the pressure change rate.

According to various embodiments of the present disclosure, a control method of an electronic device including a touch screen display and a pressure sensor includes receiving from the pressure sensor, data indicating pressure by a user or an external object to the touch screen display, determining a pressure change rate indicating a change of the pressure per unit time, and calling a function based on at least a part of at least one of a value of the pressure or the pressure change rate.

According to various embodiments of the present disclosure, in a computer-readable storage medium having stored therein a program including instructions for controlling an electronic device including a touch screen display and a pressure sensor, the instructions include a first instruction set for receiving from the pressure sensor, data indicating pressure by a user or an external object to the touch screen display, a second instruction set for determining a pressure change rate indicating a change of the pressure per unit time, and a third instruction set for calling a function based on at least a part of at least one of a value of the pressure or the pressure change rate.

According to various embodiments of the present disclosure, by controlling an operation of the electronic device in which the user uses both touch input and pressure input, an intuitive user experience corresponding to characteristics of the pressure input is provided and usability of the electronic device may be improved.

According to various embodiments of the present disclosure, the user may control the electronic device by using both the touch input and the pressure input, thereby minimizing learning required from the user.

BRIEF DESCRIPTION OF DRAWINGS

FIG. 4 illustrates an example of a configuration of an electronic device according to various embodiments of the present disclosure.

DETAILED DESCRIPTION

Figure 1:
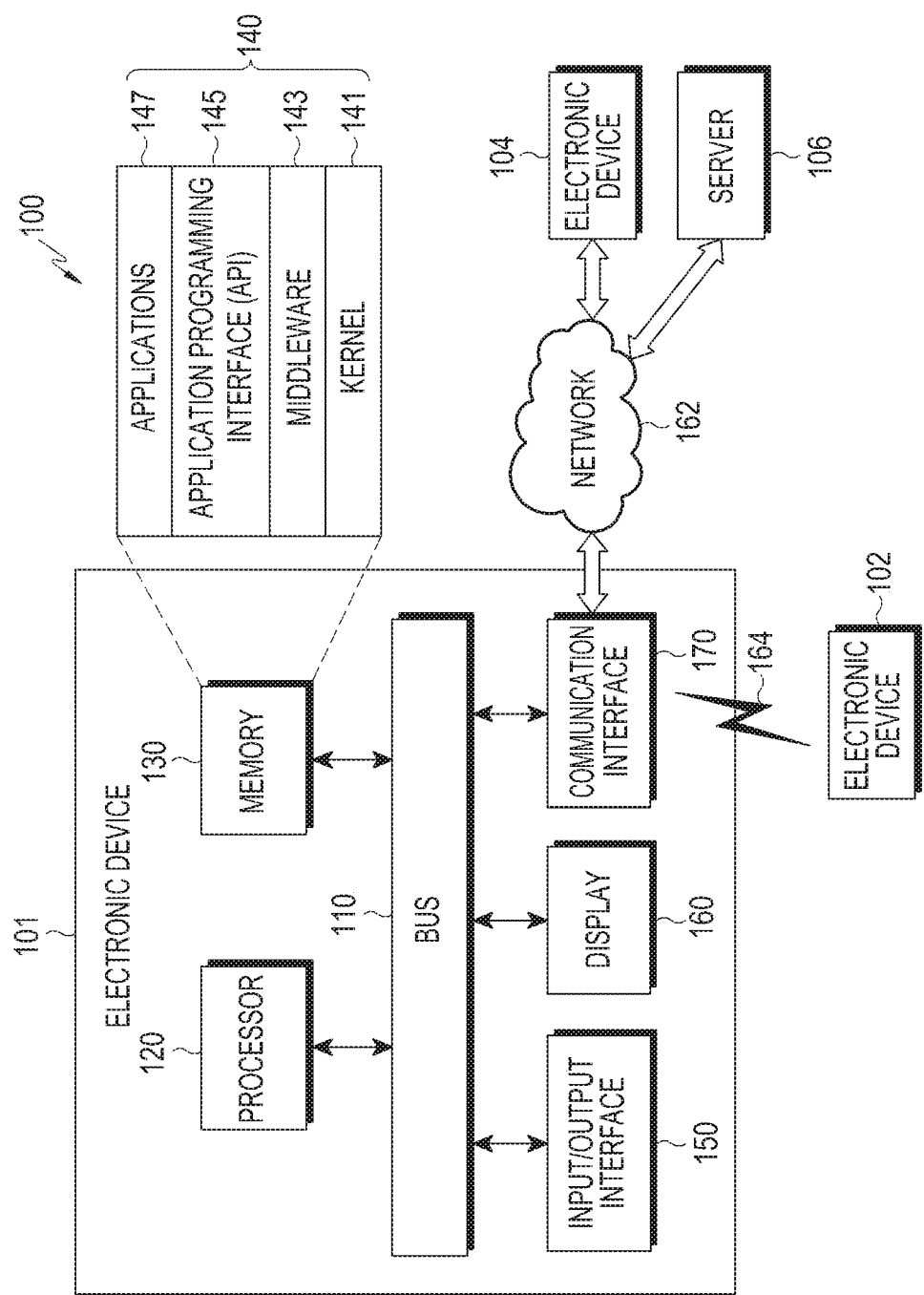
FIG. 1 illustrates an electronic device in a network environment according to various embodiments.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

As used herein, each of such phrases as "A or B," "at least one of A or/and B," "at least one or more of A or/and B," and so forth may include all possible combinations of the items enumerated together in a corresponding one of the phrases. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

Terms defined in the present disclosure are used for only describing a specific exemplary embodiment and may not have an intention to limit the scope of other exemplary embodiments. It is to be understood that a singular form of a noun corresponding to an item may include one or more of the things, unless the relevant context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

According to some embodiments, the electronic device may be a home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ PlayStation™, etc.), an electronic dictionary, an electronic key, a camcorder, a charging device, or an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (e.g., an artificial intelligence electronic device).

FIG. 1 illustrates an electronic device in a network environment according to various embodiments of the present disclosure;

The electronic device 101 may include a bus 110, a processor 120, a memory 130, an input/output (I/O) interface 150, a touch screen display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The touch screen display 160 may include, for example, a liquid crystal display (LCD), a light emitting diode (LED) display, an organic light emitting diode (OLED) display, a microelectromechanical system (MEMS) display, or an electronic paper display. The touch screen display 160 may, for example, display various contents (e.g., a text, an image, video, an icon, a symbol, etc.) to users. The touch screen display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM). The wired communication may include, for example, short-range communication 164. The short-range communication 164 may include, for example, at least one of wireless fidelity (WiFi), Bluetooth, near field communication (NFC), or the like. Depending on a usage area or bandwidth, the GNSS may include, for example, at least one of a global positioning system (GPS), a global navigation satellite system (Glonass), a Beidou navigation satellite system ("Beidou"), and Galileo, and the European global satellite-based navigation system. Hereinbelow, "GPS" may be used interchangeably with "GNSS". The wired communication may include, for example, at least one of USB, a high definition multimedia interface (HDMI), recommended standard-232 (RS-232), and a plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
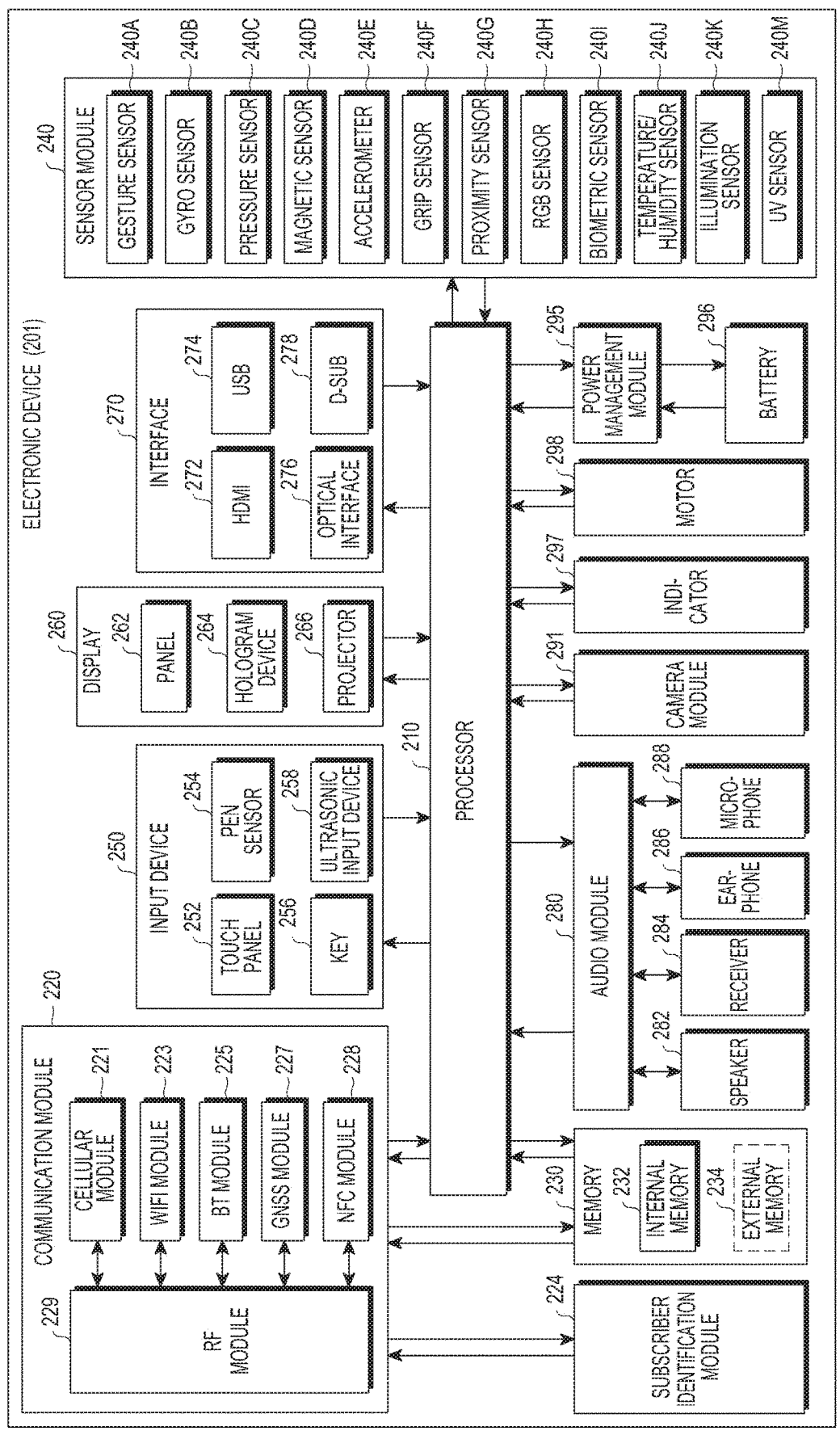
FIG. 2 is a block diagram of an electronic device according to various embodiments.

FIG. 2 is a block diagram of an electronic device 201 according to various embodiments of the present disclosure.

The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a touch screen display 260, an interface 270, an audio module 280, a camera module 291, a power management module 295, a battery 296, an indicator 297, and a motor 298.

The processor 210 may control multiple hardware or software components connected to the processor 210 by driving an OS or an application program, and perform processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores various data in the non-volatile memory.

The communication module 220 may have a configuration that is the same as or similar to the communication interface 170 illustrated in FIG. 1. The communication module 220 may include, for example, at least one of the cellular module 221, a WiFi module 223, a Bluetooth (BT) module 225, a GNSS module 227 (e.g., a GPS module, a Glonass module, a Beidou module, or a Galileo module), an NFC module 228, and a radio frequency (RF) module 229.

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to an embodiment, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module.

The SIM 224 may include, for example, a card including a SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may include, for example, at least one of a volatile memory (e.g., a dynamic random access memory (DRAM), static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The touch screen display 260 (e.g., the touch screen display 160) may include a panel 262, a hologram device 264, or a projector 266. The panel 262 may have a configuration that is the same as or similar to the touch screen display 160 illustrated in FIG. 1. The panel 262 may be implemented to be flexible, transparent, or wearable. The panel 262 may be configured with the touch panel 252 in one module. The hologram device 264 may show a stereoscopic image in the air by using interference of light. The projector 266 may display an image onto a screen through projection of light. The screen may be positioned inside or outside the electronic device 201. According to an embodiment, the touch screen display 260 may further include a control circuit for controlling the panel 262, the hologram device 264, or the projector 266.

The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) standard interface.

The audio module 280 bi-directionally converts sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288.

The camera module 291 is a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of the electronic device 201. The electronic device 201 may be, but not limited to, an electronic device supplied with power through a battery. According to an embodiment, the power management module 295 may include a power management integrated circuit (PMIC), a charger IC, or a battery or fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
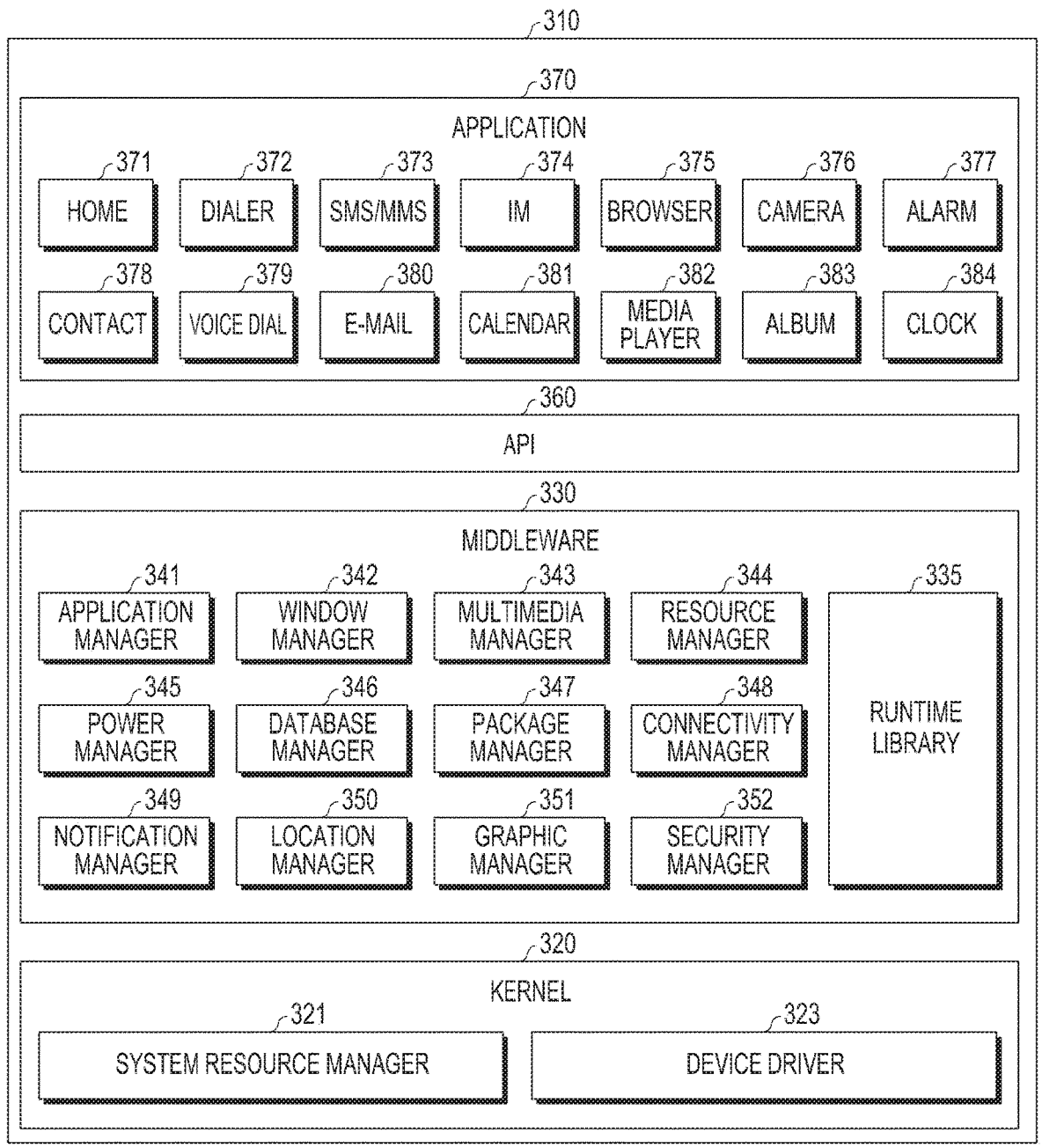
FIG. 3 is a block diagram of a programming module according to various embodiments.

FIG. 3 is a block diagram of a programming module according to various embodiments.

According to an embodiment, a programming module 310 (e.g., the program 140) may include an OS for controlling resources associated with an electronic device (e.g., the electronic device 101) and/or various applications (e.g., the application program 147) executed on the OS. The OS may include Android, iOS™, Windows™, Symbian™, Tizen™, or Samsung Bada OS™.

The programming module 310 may include, for example, a kernel 320, middleware 330, an application programming interface (API) 360, and/or an application 370. At least a part of the programming module 310 may be preloaded on an electronic device or may be downloaded from an external device (e.g., the external device 102 or 104 or the server 106).

The kernel 320 (e.g., the kernel 141) may include, for example, a system resource manager 321 and/or a device driver 323. The system resource manager 321 may perform control, allocation, retrieval of system resources, and so forth. According to an embodiment, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an input/output, memory management, or calculation operation.

The application manager 341 manages a life cycle of at least one of the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 may display or notify events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 may provide a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. For example, in Android or iOS, one API set may be provided for each platform, and in Tizen, two or more API sets may be provided for each platform.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 370 may include an application (e.g., device health care application of mobile medical equipment) designated according to an attribute of the external electronic device (e.g., the electronic device 102 or 104). According to an embodiment, the application 370 may include an application received from the external electronic device (e.g., the server 106 or the electronic device 102 or 104). According to an embodiment, the application 370 may include a preloaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least a part of the programming module 310 may include, for example, modules, programs, routines, sets of instructions, or processes for performing one or more functions.

FIG. 4 illustrates an example of a configuration of an electrode device according to various embodiments of the present disclosure.

Referring to FIG. 4, according to various embodiments of the present disclosure, the electronic device 101 may include the processor 120, an input device 410, the memory 130, and an output device 420. The electronic device 101 may further include a communication module (not shown).

According to various embodiments, the output device 420 of the electronic device 101 may include a touch screen display 422, a display driver 421, and a haptic module 423. The input device 410 may include a touch sensor 411, a touch sensor IC 412, a pressure sensor 413, and a pressure sensor IC 414. Components illustrated in FIG. 4, which have been described with reference to FIGS. 1 to 3, will not be described repeatedly.

According to various embodiments, the touch screen display 422 may receive an image driving signal provided from the display driver 421. The touch screen display 422 may display various contents and/or items (e.g., a text, an image (object), video, an icon, a function object, a symbol, etc.) based on the image driving signal. In this document, the touch screen display 422 may be overlappingly combined with the touch sensor 411 and/or the pressure sensor 413 (e.g., see FIG. 2), or may be referred to as simply a "display panel". The touch screen display 422 may be driven in a low-energy mode.

According to various embodiments, the display driver 421 may supply an image driving signal corresponding to image information received from the processor 120 to the touch screen display 422 at a set frame rate. The touch screen display driver 421 may drive the touch screen display 422 in the low-energy mode. Although not shown, according to an embodiment, the display driver 421 may include a graphic random-access memory (RAM), an interface module, an image processing unit, a multiplexer, a display timing controller (T-con), a source driver, a gate driver, and/or an oscillator, etc.

According to various embodiments, in the touch sensor 411, a designated physical quantity (e.g., a voltage, a quantity of light, a resistance, a quantity of electric charge, a capacitance, etc.) may be changed due to a user's touch. According to an embodiment, the touch sensor 411 may be arranged overlappingly with the touch screen display 422.

According to various embodiments, the touch sensor IC 412 may sense the change of the physical quantity (e.g., a voltage, a resistance, a capacitance, etc.) in the touch sensor 411 and calculate the position (X, Y) where the touch is made, based on the change of the physical quantity. The calculated position (coordinates) may be provided (or reported) to the processor 120. For example, when a user's body part (e.g., a finger), an electronic pen, or the like contacts a protective cover (e.g., 510 of FIGS. 5A and 5B) of the touch screen display 422, a coupling voltage between a transmitting terminal Tx and/or a receiving terminal Rx included in the touch sensor 411 may change. The change of the coupling voltage may be sensed by the touch sensor IC 412 which may deliver the coordinates (X, Y) of the position where the touch is made to the processor 120. The processor 120 may be obtained data regarding the coordinates (X, Y) as an event regarding a user input.

According to various embodiments, the touch sensor IC 412 may include a touch IC, a touch screen IC, a touch controller, a touch screen controller IC, etc. According to an embodiment, in an electronic device not including the touch sensor IC 412, the processor 120 may execute a function of the touch sensor IC 412. According to an embodiment, the touch sensor IC 412 and the processor 120 may be implemented in a single component (e.g., one chip).

According to various embodiments, the pressure sensor 413 may sense a pressure (or a force) from an external object (e.g., a finger or an electronic pen). According to an embodiment, in the pressure sensor 413, a physical quantity (e.g., a capacitance) between the transmitting terminal Tx and the receiving terminal Rx may be changed by a touch.

According to various embodiments, the pressure sensor IC 414 may sense the change of the physical quantity (e.g., a capacitance, etc.) in the touch sensor 413 and calculate a pressure Z applied by a user's touch, based on the change of the physical quantity. The pressure sensor IC 414 may calculate the rate of change of a pressure strength changing per unit time, a direction in which pressure is applied, etc. The pressure sensor IC 414 may provide the pressure Z, the pressure strength, the pressure direction, or the position (X, Y) where the touch is made to the processor 120.

According to various embodiments, the pressure sensor IC 414 may include a pressure input controller, a pressure sensor IC, a pressure panel IC, etc. According to various embodiments, the pressure sensor IC 414 may be implemented in a single component (e.g., one chip) together with the touch sensor IC 412.

According to various embodiments, the haptic module (e.g., a haptic actuator) 423 may provide tactile feedback (e.g., vibration) to the user in response to a control command of the processor 120. For example, the haptic module 423 may provide tactile feedback to the user when receiving a touch input (e.g., a touch, a hovering, and a pressure input) from the user.

According to various embodiments, the memory 130 may store a command or data related to operations of components included in the electronic device 110. For example, the memory 130 may store at least one application program including a user interface configured to display a plurality of items on a touch screen display. For example, the memory 130 may store instructions that cause, when executed, the processor 120 to perform various operations described herein.

According to various embodiments, the processor 120 may be electrically connected with, for example, the components 411 through 414 and 421 through 423 included in the electronic device 101. The processor 120 may perform computation or data processing for control and/or communication of the components 411 through 414 and 421 through 423 included in the electronic device 101.

According to various embodiments, the processor 120 may launch (or execute) an application program (or simply referred to as an "application") that displays a user interface on the touch screen display 422. The processor 120 may display an array of a plurality of items on the user interface displayed on the touch screen display 422 in response to launching the application.

According to various embodiments, the processor 120 may receive first data (data including the position coordinates (X, Y) of the touch) generated from the touch sensor 411 and second data (data including the pressure Z of the touch) generated from the pressure sensor 413.

According to various embodiments, the processor 120 may activate at least a part of the pressure sensor 413 while the touch screen display 422 is turned off. The processor 120 may at least partially activate the pressure sensor 413 while the touch screen display 422 is turned off. For example, the processor 120 may activate the entire pressure sensor 413 or a part thereof in a standby state of the electronic device 101 when a component such as the touch screen display 422, etc., is turned off as well as in an awake state of the electronic device 101. The processor 120 may at least partially deactivate the pressure sensor 411 while the touch screen display 422 is turned off or while the electronic device 101 is in the standby state. The processor 120 may at least partially deactivate the touch sensor 411 to reduce power consumption in the standby state and to prevent a malfunction from occurring due to a touch.

According to various embodiments, the processor 120 may activate at least a part of the pressure sensor 413 when a designated condition is achieved during the turned-off state of the touch screen display 422. For example, the processor 120 may activate the pressure sensor 413 after or during a designated time from when the touch screen display 422 is turned off. In another example, the processor 120 may activate the pressure sensor 413 upon sensing the use by the user by means of a gyro sensor, a proximity sensor, or the like. In another example, the processor 120 may activate the pressure sensor 413 when the temperature is lower than a designated value, a touch is sensed by the touch sensor 411, the electronic device 101 approaches another external device, or a stylus pen mounted in the electronic device 101 is pulled out from the electronic device 101. In another example, the processor 120 may activate the pressure sensor 413 during execution of an application (e.g., a music player) operating in the standby state.

According to various embodiments, the processor 120 may deactivate at least a part of the pressure sensor 413 when a designated condition is achieved during the turned-off state of the touch screen display 422. For example, the processor 120 may deactivate the pressure sensor 413 when sensing using a proximity sensor, an illumination sensor, an acceleration sensor, and/or a gyro sensor, etc., that the electronic device 101 is in the pocket or bag or is turned over. In another example, the processor 120 may deactivate the pressure sensor 413 when the electronic device 101 is connected with an external device (e.g., connected with a desktop).

According to various embodiments, the processor 120 may activate only a designated region of the pressure sensor 413 while the touch screen display 422 is turned off. For example, the processor 120 may activate a designated partial region of the pressure sensor 413 (e.g., a central lower region of the pressure sensor 413) to reduce power consumption in the standby state. When the pressure sensor 413 is implemented with a set of two or more sensors, the processor 120 may activate some of the two or more sensors.

According to various embodiments, the processor 120 may sense pressure using the pressure sensor 413 during the standby state of the electronic device 101, by activating the pressure sensor 413. For example, the processor 120 may receive data regarding pressure by an external object to the touch screen display 422 from the activated pressure sensor 413 during the turned-off state of the touch screen display 422.

According to various embodiments, the processor 120 may perform a function without fully turning on the touch screen display 422 based on a level of the pressure using the data regarding the pressure. For example, the processor 120 may perform a function when sensing a higher level of pressure than a designated level. In this case, the processor 120 may turn on a part of the touch screen display 422.

According to various embodiments, the processor 120 may determine a function to be executed based on at least one of the position where pressure is sensed, the strength of sensed pressure, the number of points where pressure is sensed, the pressure change amount, the direction of pressure, and the duration of pressure. For example, the processor 120 may wake up the electronic device 101 when sensing pressure in a position corresponding to a central lower portion of the touch screen display 422. The processor 120 may control the volume of a speaker of the electronic device 101 when sensing pressure in a position corresponding to a left upper portion of the touch screen display 422. The processor 120 may perform a function related to adjacent hardware upon sensing pressure in a position adjacent to hardware such as an earjack, a universal serial bus (USB) port, etc. The processor 120 may control the electronic device 101 to enter an emergency mode upon sensing the pressure of a higher strength than a designated strength. The processor 120 may perform a different function depending on the number of points where pressure is sensed at the same time.

Although it is illustrated in FIG. 4 that the pressure sensor 413 provides data regarding the pressure Z to the processor 120, the processor 120 may sense the position where pressure is applied, based on the position of a sensor where a capacitance is changed among two or more sensors, when the pressure sensor 413 is implemented with a set of the two or more sensors, without being limited to the illustration. For example, when the pressure sensor 413 is implemented with a set of six sensors arranged in a 3×2 array, the processor 120 may determine the position where pressure is applied, based on a change amount of capacitance of each sensor and the position where each sensor is arranged. For example, the processor 120 may determine the position where pressure is applied, without using the touch sensor 411. When sensing pressure using the pressure sensor 413, the processor 120 may activate the touch sensor 411 to sense the position where the pressure is applied using the activated touch sensor 411.

According to various embodiments, the processor 120 may perform a first function upon sensing, by the pressure sensor 413, the pressure of a first level applied by a touch. The processor 120 may determine the first function based on at least one of the position where the first-level pressure is sensed, the strength of the first-level pressure, the number of points where the first-level pressure is sensed, the change amount of the first-level pressure, the direction of the first-level pressure, or the duration of the first-level pressure, and perform the determined first function. The first-level pressure may mean the pressure of strength in a designated range.

According to various embodiments, the processor 120 may perform a second function associated with the first function, upon sensing, by the pressure sensor 413, the pressure of a second level applied by a touch during execution of the first function. The processor 120 may determine the second function based on at least one of the position where the second-level pressure is sensed, the strength of the second-level pressure, the number of points where the second-level pressure is sensed, the change amount of the second-level pressure, the direction of the second-level pressure, or the duration of the second-level pressure. The second-level pressure may mean the pressure of strength in a designated range. The strength of the second-level pressure may be higher or lower than that of the first-level pressure. The strength of the second-level pressure may be equal to that of the first-level pressure. The processor 120 may execute various functions based on pressure by executing the second function associated with the first function under execution, when sensing the pressure during execution of the first function. After touching on the electronic device, another function associated with a function under execution may be executed based on a change amount of pressure applied to the electronic device 101, thereby improving convenience in input manipulation.

According to various embodiments, the electronic device 101 may use a change amount of input pressure per time to distinguish a long-press input from a pressure input.

The above-described operation of the processor 120 is merely an example, and is not limited to the foregoing disclosure. For example, an operation of a processor described in other parts of the present document may also be understood as an operation of the processor 460. In this document, at least some of operations described as operations of the "electronic device" may be understood as operations of the processor 120.

According to various embodiments of the present disclosure, an electronic device includes a housing comprising a first surface directed in a first direction and a second surface directed in a second direction that is opposite to the first direction, a touch screen display located between the first surface and the second surface and exposed through the first surface, a pressure sensor located between the first surface and the second surface and configured to sense at least one pressure by an external object to the touch screen display, at least one processor electrically connected with the touch screen display and the pressure sensor, and a memory electrically connected with the processor, wherein the memory stores instructions that cause, when executed, the processor to receive from the pressure sensor, data indicating pressure by a user or the external object to the touch screen display, to determine a pressure change rate indicating a change of the pressure per unit time, and to call (or invoke) a function based on at least a part of at least one of a value of the pressure or the pressure change rate.

According to an embodiment, the instructions may cause the processor to call a first function when the value of the pressure exceeds a first threshold value and to call a second function when the value of the pressure does not exceed the first threshold value and the pressure change rate exceeds a second threshold value.

According to an embodiment, the electronic device may further include at least one of a touch panel configured to detect a hovering or a touch input by the external object or a gyro sensor configured to detect motion of the electronic device, or a motion recognition sensor of a camera.

According to an embodiment, the instructions may cause the processor to measure the pressure change rate, in which the pressure change rate is measured based on a time during which the pressure is sensed and a time during which the pressure is released.

According to an embodiment, the instructions may cause the processor to identify an input using the pressure by converting the pressure change rate into speed.

According to an embodiment, the instructions may cause the processor to call a function corresponding to at least one of or a combination of at least one of the pressure change rate or a touch duration before or after sensing the pressure.

According to an embodiment, the instructions may cause the processor to apply a motion change amount of the electronic device sensed by at least one of an acceleration sensor or a gyro sensor to call the function.

According to an embodiment, the memory may include an instruction for a function called corresponding to at least one of or a combination of at least one of the pressure change rate or a touch duration before or after sensing the pressure.

According to an embodiment, when two pressures are sensed, the processor may be further configured, by executing the instructions, to call a function corresponding to the sensed two pressures.

According to an embodiment, the called function may differ according to a type of an application displayed on the touch screen display.

Figure 5A:
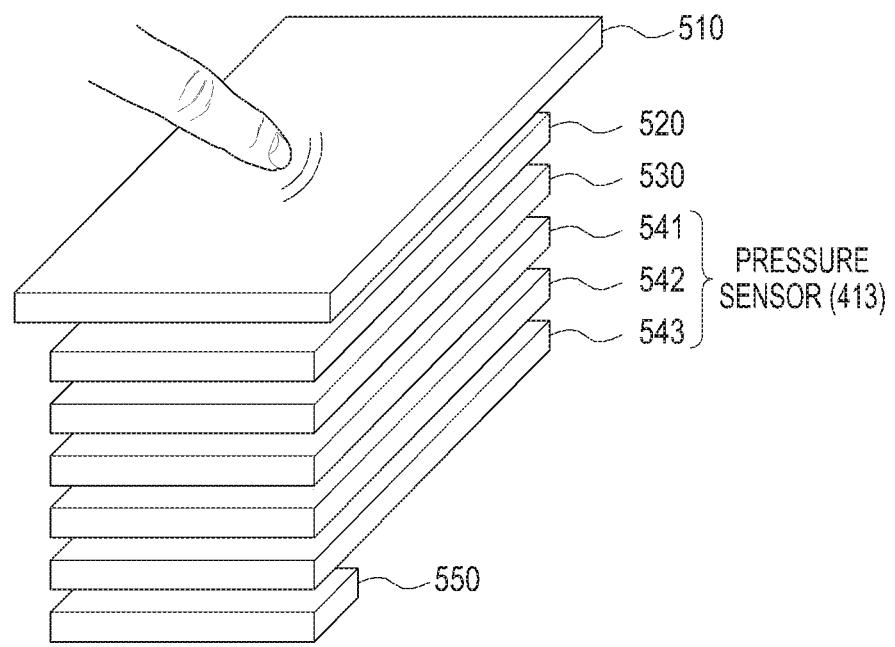
FIGS. 5A and 5B illustrate an example of a structure in which components included in an electronic device are stacked, according to various embodiments of the present disclosure.
Figure 5B:
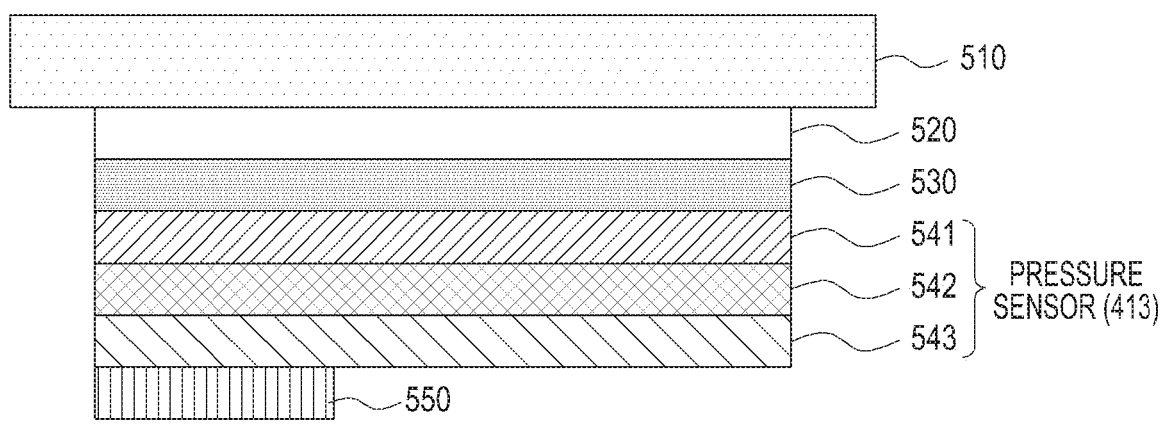

FIGS. 5A and 5B illustrate an example of a structure in which components included in the electronic device 101 are stacked, according to various embodiments of the present disclosure.

The electronic device 101 according to various embodiments of the present disclosure may include a housing (not shown) including a first surface directed in a first direction, a second surface directed in a second direction that is opposite to the first direction, and a side surface surrounding a space between the first surface and the second surface, and a touch screen display exposed through the first surface between the first surface and the second surface.

A stacked structure illustrated in FIGS. 5A and 5B may be applied to the touch screen display 160 illustrated in FIG. 1. Components illustrated in FIGS. 5A and 5B may be arranged between a front surface (a first surface) and a rear surface (a second surface) of the electronic device 101 of FIG. 1.

In the stacked structure of the touch screen display according to an embodiment, the protective cover 510 may transmit light generated by a touch screen display 530. A user on the protective cover 510 may contact the touch screen display by a part of the body (e.g., a finger) (including using an electronic pen). The protective cover 510 may be formed of, for example, reinforced glass, reinforced plastic, a flexible high-polymer material, etc., to protect an electronic device having a touch screen display and a touch screen display mounted thereon from an external shock. According to an embodiment, the protective cover 510 may be mentioned as a glass window or cover window.

According to various embodiments of the present disclosure, the touch sensor 520 may detect the change of various physical quantities (e.g., a voltage, an amount of light, a resistance, an amount of electric charge, a capacitance, etc.) caused by contact of an external object (e.g., a user's finger or an electronic pen). The touch sensor 520 may detect at least one position of a touch input by the external object on a touch screen display (e.g., on the surface of the protective cover 520) based on the change of a physical quantity. For example, the touch sensor 520 may include a capacitive touch sensor, a pressure touch sensor, an infrared touch sensor, a resistive pressure sensor, a piezo touch sensor, etc. According to an embodiment, the touch sensor 520 may be referred to as various names such as a touch panel or the like, depending on an implementation type.

According to various embodiments of the present disclosure, the touch screen display 530 may output at least one content or item (e.g., a text, an image, a video, an icon, a widget, a symbol, etc.). The touch screen display 530 may include, for example, an LCD panel, an LED display panel, an OLED display panel, a MEMS display panel, or an electronic paper display panel.

According to various embodiments of the present disclosure, the touch screen display 530 may be implemented in a single piece with the touch sensor (or a touch panel) 520. In this case, the touch screen display 530 may be referred to as a touch screen panel (TSP) or a touch screen display panel.

According to various embodiments of the present disclosure, the pressure sensor 413 may detect pressure (or force) applied from an external object (e.g., a finger or an electronic pen) to a touch screen display (e.g., the surface of the protective cover 510). According to an embodiment, the pressure sensor 413 may include a first electrode 541, a second electrode 543, and a dielectric layer 542. For example, the pressure sensor 413 may sense the pressure of a touch based on a capacitance changing with the pressure of the touch between the first electrode 541 and the second electrode 543. The pressure sensor 413 may measure the strength of the pressure input onto the touch screen display. The pressure sensor 413 may measure the strength of the pressure by the stylus pen or the finger and deliver the measured strength to the processor 120. The electronic device 101 may sense at least two inputs being input at the same time (or with a time interval therebetween) through the touch panel 520 and the pressure sensor 413. The pressure sensor 413 may measure a pressure change amount. The pressure sensor 413 may measure a pressure change amount per time based on a time during which the pressure is sensed and a time during which the pressure is released. Although it is illustrated in FIGS. 5A and 5B that the pressure sensor is implemented with a single sensor, the pressure sensor 413 may be implemented with a set of two or more sensors, without being limited to the illustration. For example, the pressure sensor 413 may be implemented with a set of six sensors arranged in a 3×2 array.

According to various embodiments of the present disclosure, a haptic module (e.g., a haptic actuator) 550 may provide a haptic feedback (e.g., vibration) to the user when receiving a touch (including a hovering and/or a "pressure input") input by an external object (e.g., a user's finger or an electronic pen, etc.). To this end, the haptic module 550 may include a piezoelectric member and/or a vibration plate, etc.

The stacked structure of the touch screen display illustrated in FIGS. 5A and 5B described above is an example, and may be changed variously. For example, the touch sensor 520 may be formed directly on the rear surface of the protective cover 510 (a so-called 'protective cover-integrated touch panel'), may be separately manufactured and be inserted between the protective cover 510 and the touch screen display 530 (e.g., an add-on touch panel), may be formed directly on the touch screen display 530 (e.g., an on-cell touch panel), or may be included in the touch screen display 530 (e.g., an in-cell touch panel). According to various embodiments, the above-described stacked structure may further include a fingerprint sensor of an area type implemented opaque or transparent.

Figure 6:
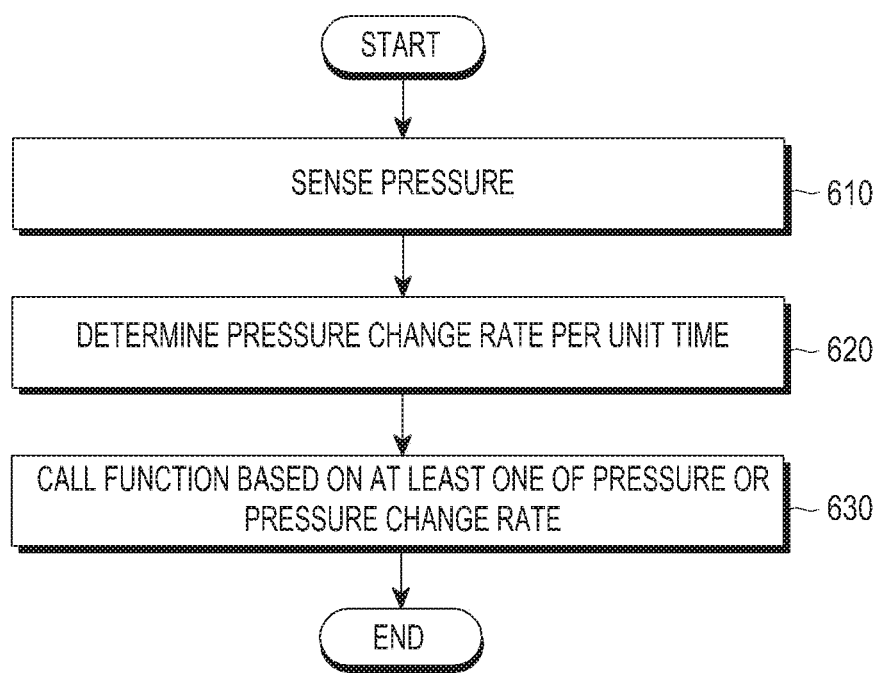
FIG. 6 is a flowchart illustrating an operation of controlling an electronic device according to various embodiments of the present disclosure.

FIG. 6 is a flowchart illustrating an operation of controlling an electronic device according to various embodiments of the present disclosure.

Referring to FIG. 6, a detailed description will be made of an operation of controlling an electronic device according to an embodiment of the present disclosure.

In operation 610, the electronic device 101 may sense pressure. The electronic device 101 may sense at least one pressure input by a user's body part and/or an external object through the touch screen display 160. The electronic device 101 may sense a touch or a pressure input from the user's body part and/or the external object.

In operation 620, the electronic device 101 may determine a pressure change rate per unit time. The electronic device 101 may sense a change in the strength of pressure. The electronic device 101 may determine the pressure strength change rate per unit time.

In operation 630, the electronic device 101 may determine a function to be called, based on the pressure strength change rate per unit time. The electronic device 101 may control the electronic device 101 based on at least one of a value (strength) of the pressure or a pressure change rate. For example, the electronic device 101 may read an instruction corresponding to at least one of the value of the pressure or the pressure change rate from the memory 130 and control a function (or operation) of the electronic device 101 according to the read instruction. The electronic device 101 may compare the value of the pressure with a set threshold value. For example, the processor may call a first function when the value (or strength) of the pressure exceeds a first threshold value and call a second function when the pressure change rate (e.g., the pressure strength change rate) does not exceed the first threshold value and the pressure change rate exceeds a second threshold value. The first function or the second function may vary with a type of an application displayed on the touch screen display 160. For example, when a home screen is currently displayed on the touch screen display 160 of the electronic device 101, the first function or the second function may include a function applicable to the home screen.

Figure 7:
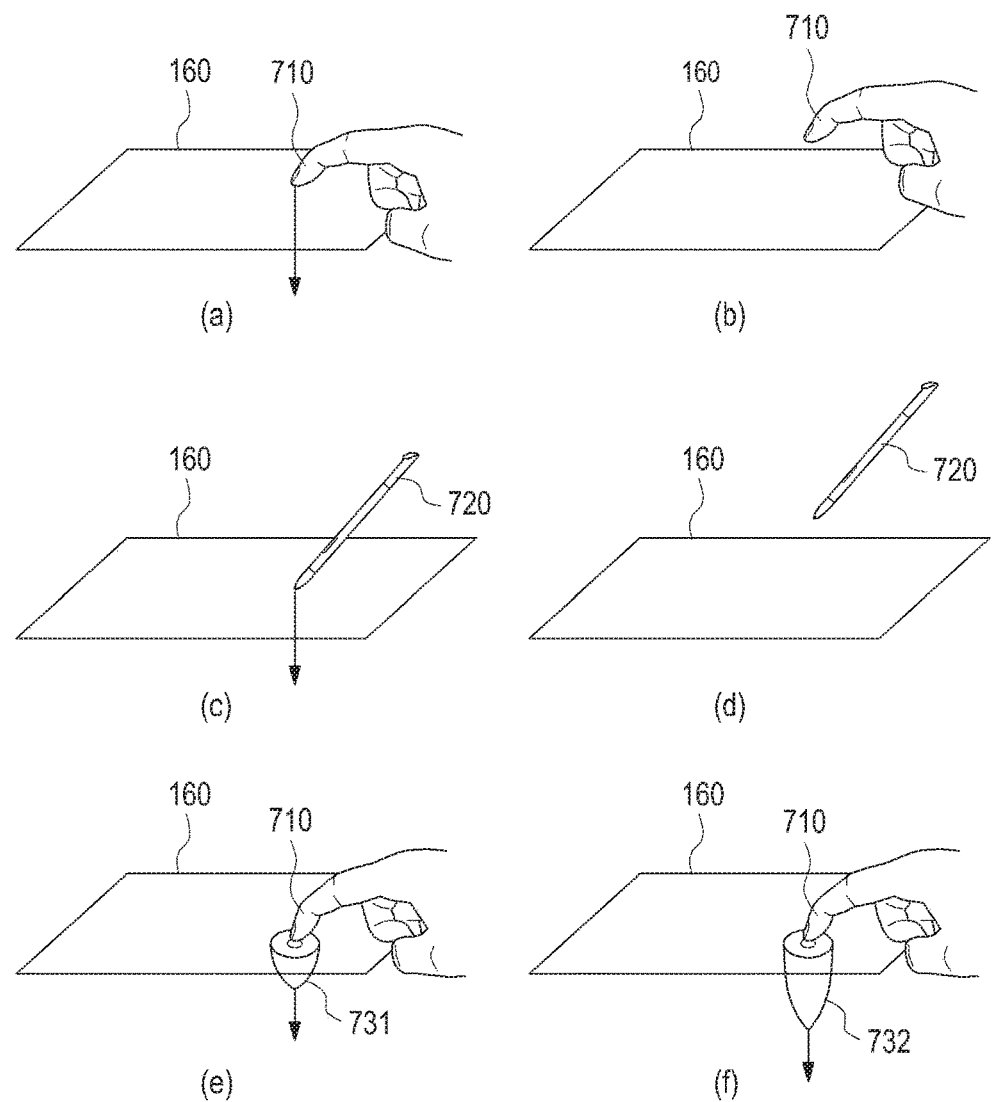
FIG. 7 illustrates an example of an input being input by a user or an external object, according to various embodiments of the present disclosure.

FIG. 7 illustrates an example of an input being input by a user or an external object, according to various embodiments of the present disclosure.

(a) of FIG. 7 illustrates a touch on the touch screen display 160 using a user's body part according to an embodiment of the present disclosure, and (b) of FIG. 7 illustrates an input using a hovering on the touch screen display 160 using the user's body part according to an embodiment of the present disclosure.

Referring to (a) and (b) of FIG. 7, the touch screen display 160 according to various embodiments of the present disclosure may sense the touch of a user's body part (e.g., a finger) 710. The processor 120 of the electronic device 101 may receive from the touch sensor 520 of the touch screen display 160 and/or the pressure sensor 413, coordinate information regarding a point on the touch screen display where a touch or a pressure input is sensed. The touch screen display 160 may sense a hovering using the user's body part (e.g., a finger) 710. The electronic device 101 may calculate the distance between the display 160 and the finger 710 in real time.

(c) of FIG. 7 illustrates a touch on the touch screen display 160 using an external object (e.g., a stylus pen) according to an embodiment of the present disclosure, and (d) of FIG. 7 illustrates an input using a hovering on the touch screen display 160 using the external object (e.g., the stylus pen) according to an embodiment of the present disclosure.

Referring to (c) and (d) of FIG. 7, the touch screen display 160 according to various embodiments of the present disclosure may sense a touch using an external object (e.g., a stylus pen) 720. The processor 120 of the electronic device 101 may receive from the touch sensor 520 of the touch screen display 160 and/or the pressure sensor 413, coordinate information regarding a point on the touch screen display where a touch or a pressure input is sensed. The touch screen display 160 may sense a hovering using the external object (e.g., the stylus pen) 720. The electronic device 101 may calculate the distance between the display 160 and the finger 720.

(e) of FIG. 7 illustrates a first pressure input onto the touch screen display 160 using a user's body part according to an embodiment of the present disclosure, and (f) of FIG. 7 illustrates a second pressure input onto the touch screen display 160 using the user's body part according to an embodiment of the present disclosure.

Referring to (e) and (f) of FIG. 7, the touch screen display 160 according to various embodiments of the present disclosure may sense a pressure input using the finger 710. The processor 120 of the electronic device 101 may receive from the touch sensor 520 of the touch screen display 160 and/or the pressure sensor 413, coordinate information regarding a point on the touch screen display where a touch or a pressure input is sensed. The electronic device 101 may measure strengths 731 and 732 of a pressure input being input by the finger 710. As illustrated in (e) of FIG. 7, the touch screen display 160 of the electronic device 101 may sense the first pressure input having a first strength. As illustrated in (f) of FIG. 7, the touch screen display 160 of the electronic device 101 may sense the second pressure input having a second strength. The first pressure input may be less in strength than the second pressure input.

(g) of FIG. 7 illustrates the strength of the first pressure input of (e) of FIG. 7 and the strength of the second pressure input of (f) of FIG. 7.

Referring to (g) of FIG. 7, a first graph 733 is a graph indicating the strength of the first pressure input sensed in (e) of FIG. 7 over time (e.g., a time during which the pressure is sensed and a time during which the pressure is released), and a second graph 734 is a graph indicating the strength of the second pressure input sensed in (f) of FIG. 7 over time. When a time $t_1$, during which the first pressure input is sensed and the pressure is released, and a time $t_2$, during which the second pressure input is sensed and the pressure is released are the same as each other (or similar to each other with a slight difference therebetween), the strength of the first pressure input and the strength of the second pressure input may be different from each other. For example, when input of a touch is sensed on the touch screen display 160, the electronic device 101 may determine the strength of the pressure of the sensed touch. The electronic device 101 may determine the touch as a simple touch input when the strength of the pressure by the touch is within a first threshold value 735. When the strength of the pressure by the touch exceeds the first threshold value 735 and is within a second threshold value 736, the electronic device 101 may determine the touch as the first pressure input. When the strength of the pressure by the touch exceeds the second threshold value 736, the electronic device 101 may determine the touch as the second pressure input. For example, even when the times during which the pressure inputs are sensed and the pressures are released are the same as each other, if the strengths of the pressure inputs are different from each other, the electronic device 101 may determine that the sensed pressure inputs call different functions. The electronic device 101 may also determine that the sensed pressure inputs call different functions when the strengths of the pressures are the same as each other (or similar to each other with a slight difference therebetween and exist within the same threshold range) and the times during which the pressure inputs are sensed and the pressures are released are different from each other.

Figure 8:
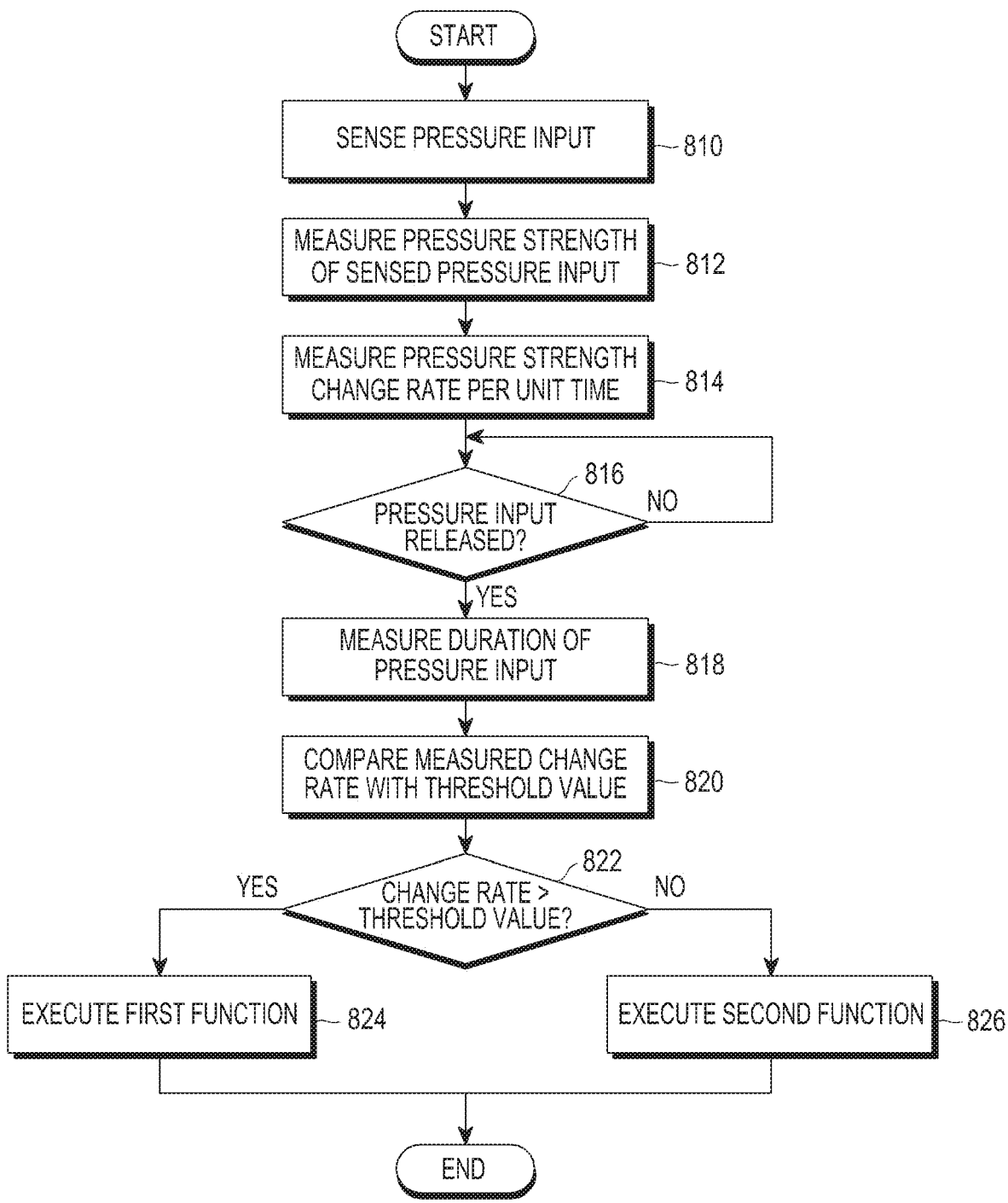
FIG. 8 is a flowchart illustrating an operation of controlling an electronic device according to another embodiment of the present disclosure.

FIG. 8 is a flowchart illustrating an operation of controlling an electronic device according to another embodiment of the present disclosure.

Referring to FIG. 8, in operation 810, the electronic device 101 may sense pressure. The electronic device 101 may sense at least one pressure input by a user's body part and/or an external object through the touch screen display 160, and measure the strength of the sensed pressure. The electronic device 101 may sense a touch or a pressure input from the user's body part and/or the external object.

In operation 812, the electronic device 101 may measure the pressure strength of the sensed pressure input. The processor 120 of the electronic device 101 may measure the pressure strength at a point on the touch screen display where the touch or the pressure input is sensed. According to an embodiment, the processor 120 of the electronic device 101 may receive from the pressure sensor 413, the pressure strength at the point on the touch screen display where the touch or the pressure input is sensed. The electronic device 101 may measure the pressure strength per unit time. According to an embodiment, the electronic device 101 may receive the pressure strength per unit time from the pressure sensor 413.

In operation 814, the electronic device 101 may measure the pressure strength change rate per unit time. The electronic device 101 may sense the change of a physical quantity (e.g., a capacitance, etc.) in the pressure sensor 413 based on the pressure input. The electronic device 101 may calculate the pressure Z applied by the user's touch based on the change of the physical quantity. The electronic device 101 may measure the pressure strength change rate per unit time. According to an embodiment, the electronic device 101 may receive the pressure strength change rate per unit time from the pressure sensor IC 414.

In operation 816, the electronic device 101 may sense the release of the pressure input. The electronic device 101 may sense the releasing of the pressure input based on the pressure strength change rate per unit time.

In operation 818, the electronic device 101 may measure a duration of the pressure input. The electronic device 101 may drive a timer upon sensing the pressure input in operation 810. The electronic device 101 may measure the duration of the pressure input through the driven timer, when the pressure input is released in operation 816. According to an embodiment, the electronic device 101 may drive the timer when the pressure strength measured in operation 812 exceeds a set threshold value, and may measure the duration of the pressure input when the strength of the pressure input released in operation 816 is less than the threshold value. The electronic device 101 may drive a separate timer for a case where the pressure strength exceeds the threshold value, and may measure the duration of pressure within each threshold range.

In operation 820, the electronic device 101 may compare the measured change rate with a change rate threshold value. The electronic device 101 may calculate a pressure change rate (or a change amount) by using the pressure strength and the measured time. The electronic device 101 may measure a change rate (or a change amount) by which the pressure is increased (or reduced). The electronic device 101 may calculate the pressure change rate (or the change amount) by dividing the measured pressure by the measured time.

When the measured change rate exceeds the threshold value in operation 822, the electronic device 101 may perform a first function based on the sensed pressure input in operation 824. The electronic device 101 may perform the first function when the measured change rate of the pressure strength exceeds the threshold value.

When the measured change rate does not exceed the threshold value in operation 822, the electronic device 101 may perform a second function based on the sensed pressure input in operation 826. The electronic device 101 may perform the second function when the measured change rate of the pressure strength does not exceed the threshold value. The first function may be different from the second function.

According to an embodiment, the electronic device 101 may call a function corresponding to the pressure change rate (or the change amount). The electronic device 101 may determine the pressure change rate, pressure may be used differently based on the pressure change rate to control the electronic device 101. For example, when two pressure inputs having the same pressure strength have different pressure change rates (or change amounts), the electronic device 101 may call different functions. For a case where pressure having a pressure strength of 10 is input during 100 ms and a case where pressure having a pressure strength of 10 is input during 50 ms, the electronic device 101 may call different functions.

Figure 9:
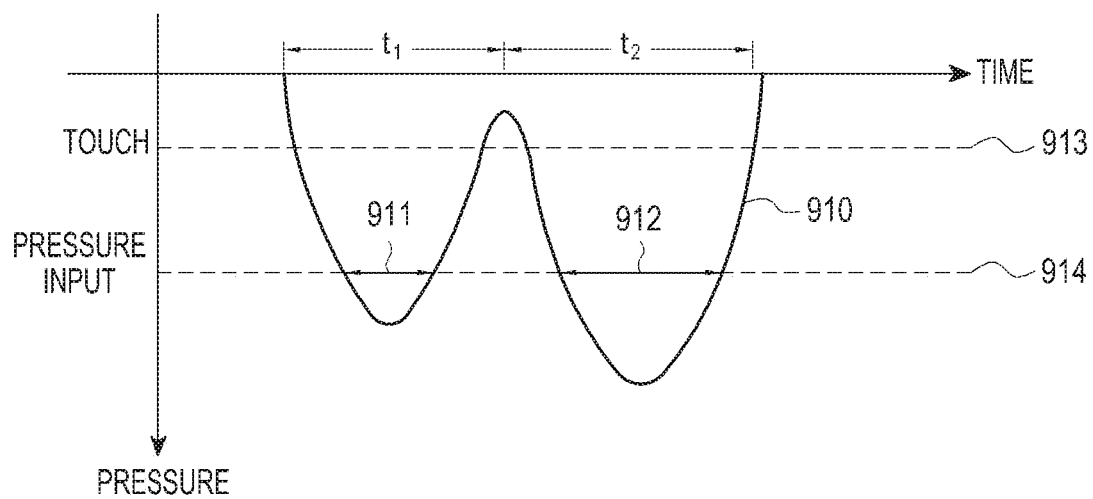
FIG. 9 illustrates an example in which a pressure strength of a pressure input changes according to an embodiment of the present disclosure.

FIG. 9 illustrates an example in which the pressure strength of a pressure input changes according to an embodiment of the present disclosure.

Referring to FIG. 9, the pressure strength of a pressure input may change over time. The user may input a pressure input while freely controlling the pressure strength. For example, the electronic device may input a second pressure input having a higher strength than that of the first pressure input within a second time (e.g., $t_2$) after making the first pressure input within a first time (e.g., $t_1$). The electronic device may also input the second pressure input having the lower strength than that of the first pressure input within the second time (e.g., $t_2$) after making the first pressure input within the first time (e.g., $t_1$). The strength of the pressure input being input within the first time (e.g., $t_1$) may be higher or lower than that of the pressure input being input within the second time (e.g., $t_2$). The electronic device 101 may measure the pressure strength 910 of a pressure input being input by the user. The electronic device 101 may recognize an input as a touch when the pressure strength of the input based on the touch is less than a first threshold 913 and recognize the input as a first pressure input when the pressure strength is greater than the first threshold value 913 and less than a second threshold value 914. The electronic device 101 may measure a time 911 during which the first pressure input is maintained exceeding the second threshold value 914, and a time 912 during which the second pressure input is maintained exceeding the second threshold value 914.

The electronic device 101 may call (or execute) different functions based on the strengths of pressure inputs. The electronic device 101 may call a function corresponding to at least one or a combination of at least one of the pressure strength of the pressure input, the total input time (e.g., $t_1+t_2$) of the pressure input, the strength of the first pressure input, the time $t_1$ of the first pressure input, the time $t_2$ of the second pressure input, or the pressure change rate.

Figure 10:
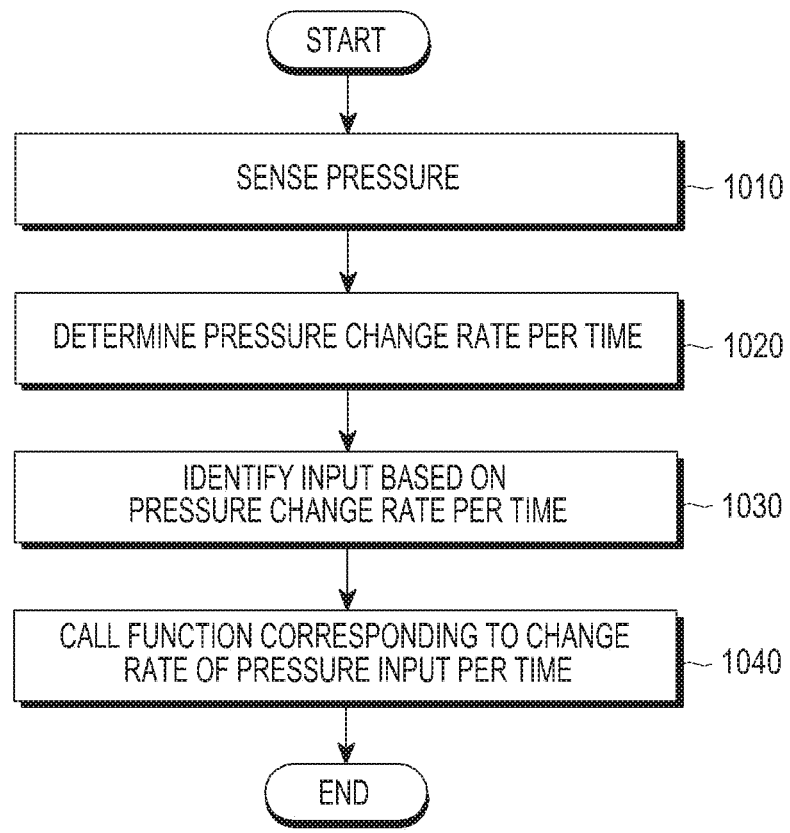
FIG. 10 is a flowchart illustrating an operation of performing a pressure input according to an embodiment of the present disclosure.

FIG. 10 is a flowchart illustrating an operation of performing a pressure input according to an embodiment of the present disclosure.

Hereinbelow, referring to FIG. 10, a detailed description will be made of an operation of performing pressure input according to an embodiment of the present disclosure.

In operation 1010, the electronic device 101 may sense pressure. The electronic device 101 may sense at least one pressure input being input by a user's body part and/or an external object to the touch screen display 160. The electronic device 101 may sense a touch or a pressure input from the user's body part and/or the external object.

In operation 1020, the electronic device 101 may determine a pressure change amount per unit time. For example, upon sensing pressure input, the electronic device 101 may determine a pressure change amount per time by using the change amount of pressure increase (or reduction) to a preset pressure and the time taken to reach the preset pressure. Upon sensing the pressure input, the electronic device 101 may determine the pressure change amount per time by using the strength of pressure input being input within a preset time.

In operation 1030, the electronic device 101 may identify the input based on a pressure change amount per time. For example, the electronic device 101 may determine whether the pressure change amount per time is greater than or equal to a pressure change amount per time which is set to execute a function until the pressure input reaches a second threshold value being less than a first threshold value although not exceeding the first threshold value. When determining that the pressure change amount per time is greater than or equal to the pressure change amount set for execution of the function until the pressure input reaches the second threshold value, the electronic device 101 may determine that the pressure input is input for executing the function although not exceeding the first threshold value.

In operation 1040, the electronic device 101 may call a function corresponding to a change rate of the pressure input per time. The electronic device 101 may call a function corresponding to the change rate of the pressure input per time based on results obtained in operations 101 through 1030. The electronic device 101 may adjust a threshold value to correspond to a user experience.

According to various embodiments of the present disclosure, the electronic device 101 may call a function corresponding to at least one of or a combination of at least one of the pressure change rate or the touch duration before or after sensing the pressure. The electronic device 101 may call the function corresponding to pressure strength change. The electronic device 101 may sense a motion change amount of the electronic device 101 by using at least one of the gyro sensor 240B or the acceleration sensor 240E, and apply the sensed change amount to call the function. The electronic device 101 may call a function corresponding to sensing two pressures. The electronic device 101 may be applied to determine user's intention based on at least a part of at least one of user's motions recognized through the camera module 291.

According to various embodiments, a control method of an electronic device including a touch screen display and a pressure sensor may include receiving from the pressure sensor, data indicating pressure by a user or an external object to the touch screen display, determining a pressure change rate indicating a change of the pressure per unit time, and calling a function based on at least a part of at least one of a value of the pressure or the pressure change rate.

According to an embodiment, the calling of the function may include calling a first function when the value of the pressure exceeds a first threshold value and calling a second function when the value of the pressure does not exceed the first threshold value and the pressure change rate exceeds a second threshold value.

According to an embodiment, the receiving of the data may include at least one of detecting a touch by the external object, detecting a gesture by the external object, detecting a motion of the electronic device, and recognizing a motion by using a camera included in the electronic device.

According to an embodiment, the present disclosure may further include measuring the pressure change rate, in which the pressure change rate is measured based on a time during which the pressure is sensed and a time during which the pressure is released.

According to an embodiment, the present disclosure may further include identifying an input using the pressure by converting the pressure change rate into speed.

According to an embodiment, the calling of the function may include calling a function corresponding to at least one of or a combination of at least one of the pressure change rate or a touch duration before or after sensing the pressure.

According to an embodiment, the calling of the function may include sensing a motion change amount of the electronic device by using at least one of an acceleration sensor or a gyro sensor included in the electronic device and applying the sensed motion change amount to call the function.

According to an embodiment, the calling of the function may include calling from a memory, an instruction corresponding to at least one of or a combination of at least one of the pressure change rate or a touch duration before or after sensing the pressure.

According to an embodiment, the present disclosure may further include sensing two pressures input by the user or the external object and calling a function corresponding to the sensed two pressures.

According to an embodiment, the calling of the function may include calling different functions according to a type of an application displayed on the touch screen display.

Figure 11:
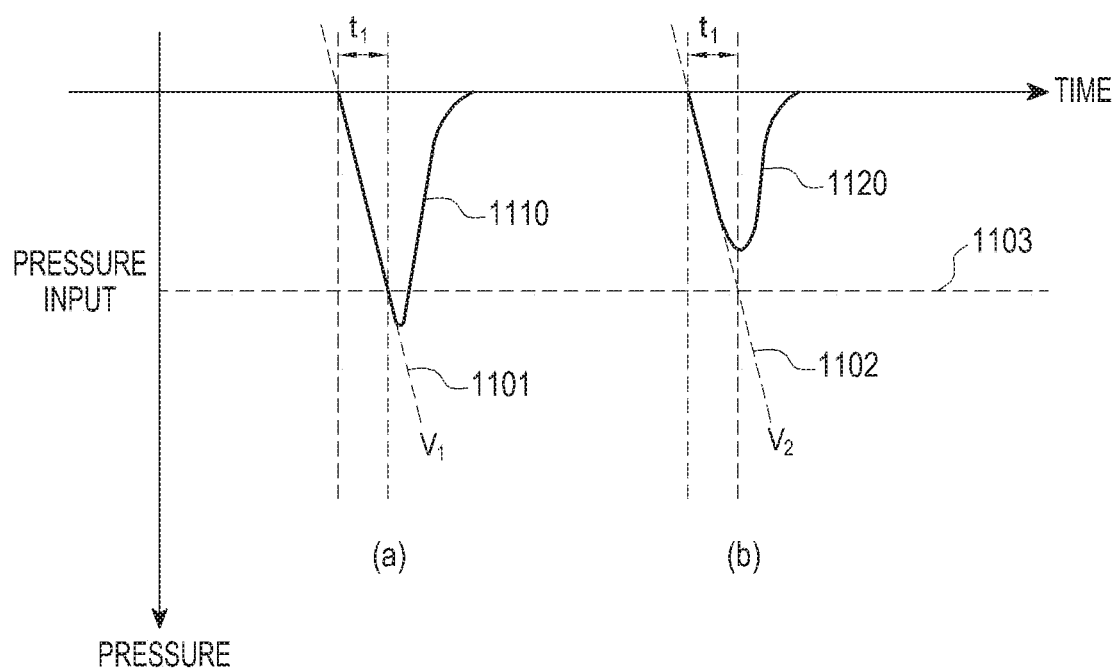
FIG. 11 illustrates execution of a function using a pressure variation per time with different pressure strengths, according to an embodiment of the present disclosure.

FIG. 11 illustrates the execution of a function using a pressure variation per time with different pressure strengths, according to an embodiment of the present disclosure.

(a) of FIG. 11 is a graph illustrating the pressure strength of a first pressure input needed for execution of a first function or a change amount per time of the first pressure input according to an embodiment of the present disclosure, and (b) of FIG. 11 is a graph illustrating a change amount per time of a second pressure input actually input by a user to execute the first function according to an embodiment of the present disclosure.

Referring to FIG. 11, pressure input needed to execute a function may have a different threshold value than that of pressure input actually input to execute the function. For example, a first pressure input 1110 needed to execute the function has to exceed a first threshold value 1103, but a second pressure input 1120 actually input to execute the function may not exceed the first threshold value 1103. For example, the electronic device 101 may use the gradient 1101 during the time $t_1$ of the first pressure input being input to execute the function. A gradient 1101 may be stored in the memory 1130. When the user inputs the second pressure input 1120 to execute the function, but the second pressure input 1120 does not exceed the first threshold value 1103, the electronic device 101 may determine a gradient 1102 of the second pressure input 1120 during the time $t_1$. When the electronic device 101 determines that the gradient 1102 of the second pressure input 1120 is greater than or equal to the gradient 1101 stored in the memory 130, the second pressure input 1120 may be determined as a pressure input for calling (or executing) the function even though not exceeding the first threshold value 1103.

FIGS. 12A through 12G illustrate examples of inputs based on at least one of the pressure strength of a pressure input, the number of pressure inputs, the pressure variation rate of a pressure input, the time difference between pressure inputs, the touch input, the touch holding time, or shaking or some combinations thereof, according to various embodiments of the present disclosure.

Figure 12A:
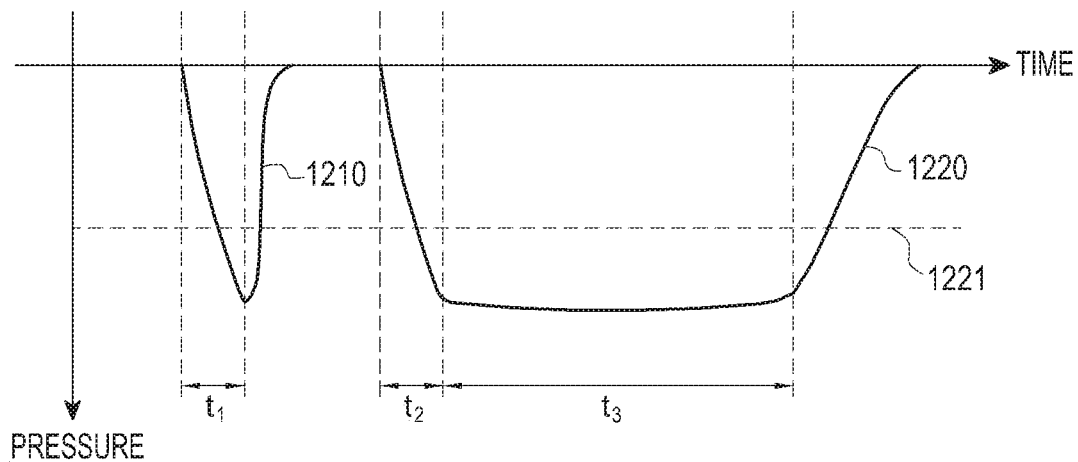
FIGS. 12A through 12G illustrate examples of inputs based on at least one of a pressure strength of a pressure input, the number of pressure inputs, a pressure variation rate of a pressure input, a time difference between pressure inputs, a touch input, a touch holding time, or shaking or some combinations thereof, according to various embodiments of the present disclosure.

Referring to FIG. 12A, the user may input a first pressure input 1210 during the first time $t_1$ and then immediately release the pressure, and input a second pressure input 1220 during the second time $t_2$ and release the pressure after maintaining the pressure during a third time $t_3$. The strength of the first pressure input 1210 and the strength of the second pressure input 1220 may exceed a first threshold value 1221. Any one of the strengths of the first pressure input 1210 and the strength of the second pressure input 1220 may exceed the first threshold value 1221. The strength of the first pressure input 1210 and the strength of the second pressure input 1220 may not exceed the first threshold value 1221. The electronic device 101 may call different functions corresponding to such various cases. The electronic device 101 may measure the strength of the first pressure input 1210 and the second pressure input 1220. The first threshold value 1221 and the first time $t_1$ through the third time $t_3$ may be adjusted variably.

Figure 12B:
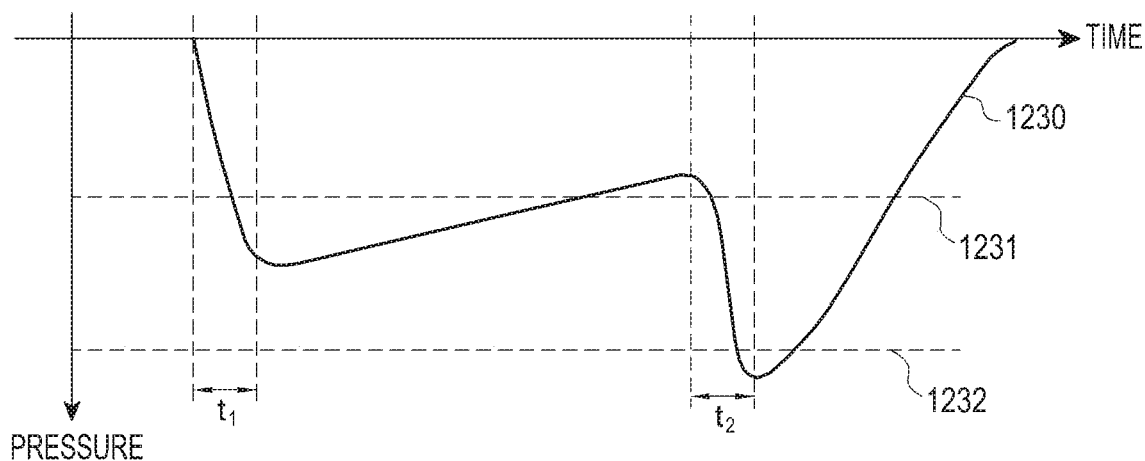

Referring to FIG. 12B, the user may input a first pressure input 1230 such that the pressure exceeds a first threshold value 1231 during the first time $t_1$, reduce the pressure to a value less than the first threshold value 1231, increase the pressure such that the pressure exceeds a second threshold value 1232 during the second time $t_2$, and then release the pressure. The user may input the first pressure input 1230 such that the pressure exceeds the second threshold value 1232 during the first time $t_1$, reduce the pressure to a value not exceeding the first threshold value 1231, increase the pressure such that the pressure exceeds the first threshold value 1231 during the second time $t_2$, and then release the pressure. The electronic device 101 may sense such user input. The first threshold value 1231, the second threshold value 1232, and the first time $t_1$ through the third time $t_3$ may be adjusted variably.

Figure 12C:
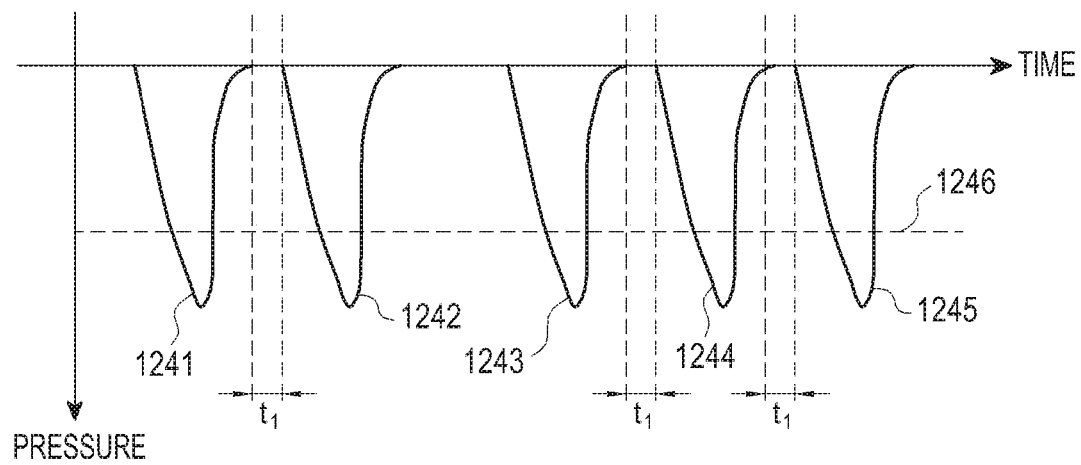

Referring to FIG. 12C, the user may input a first pressure input 1241 such that the pressure exceeds a first threshold value 1246, input a second pressure input 1242 having the same strength as the first pressure input 1241 after the determined time $t_1$, and input a third pressure input 1243, a fourth pressure input 1244, and a fifth pressure input 1245 having the same strength as the first pressure input 1241 and the second pressure input 1242 after a time longer than the determined time $t_1$ has elapsed. The third pressure input 1243, the fourth pressure input 1244, and the fifth pressure input 1245 may be input with an interval of the determined time $t_1$ therebetween. The electronic device 101 may sense such user input. The first threshold value 1246 and the first time $t_1$ may be adjusted variably.

Figure 12D:
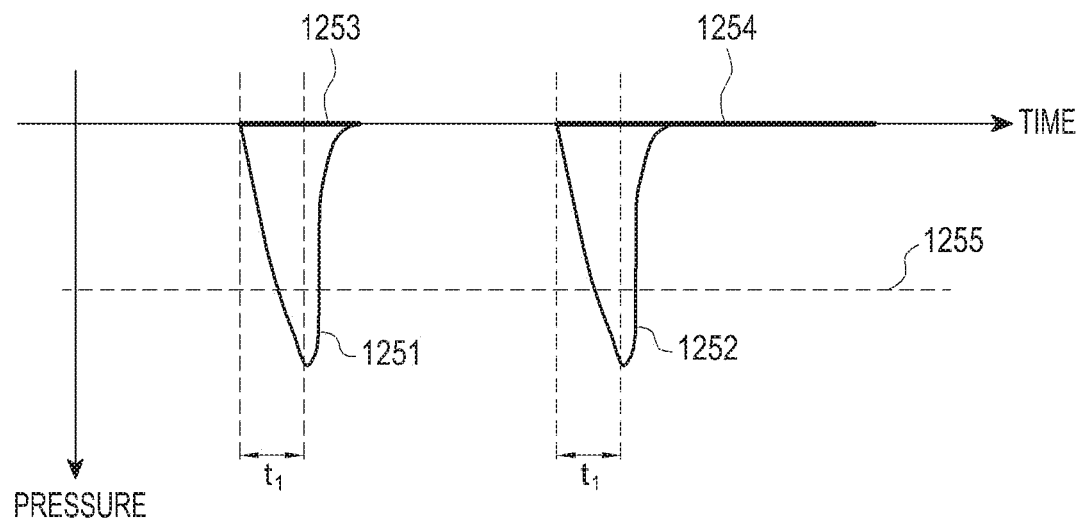

Referring to FIG. 12D, the electronic device 101 may identify an input by using a combination of a touch and a pressure input. For example, the user may input a first pressure input 1251 such that the pressure exceeds a first threshold value 1255 during the time $t_1$ in a state where the electronic device 101 maintains a first touch input as indicated by 1253, and may release the first touch input and the first pressure input 1251. The first pressure input and the first pressure input 1251 may be input at the same time. The user may input a second pressure input 1251 such that the pressure exceeds the first threshold value 1255 during the time $t_1$ in a state where the electronic device 101 maintains a second touch input, and may release a second pressure input 1252 in a state where the electronic device 101 maintains the second touch input, and then release the second touch input after a set time has elapsed. The electronic device 101 may determine these two cases as different inputs by using a difference between the durations of the pressure input and the touch input. The first threshold value 1255, the determined time $t_1$, the duration 1253 of the first touch input, and the duration 1254 of the second touch input may be adjusted variably.

Figure 12E:
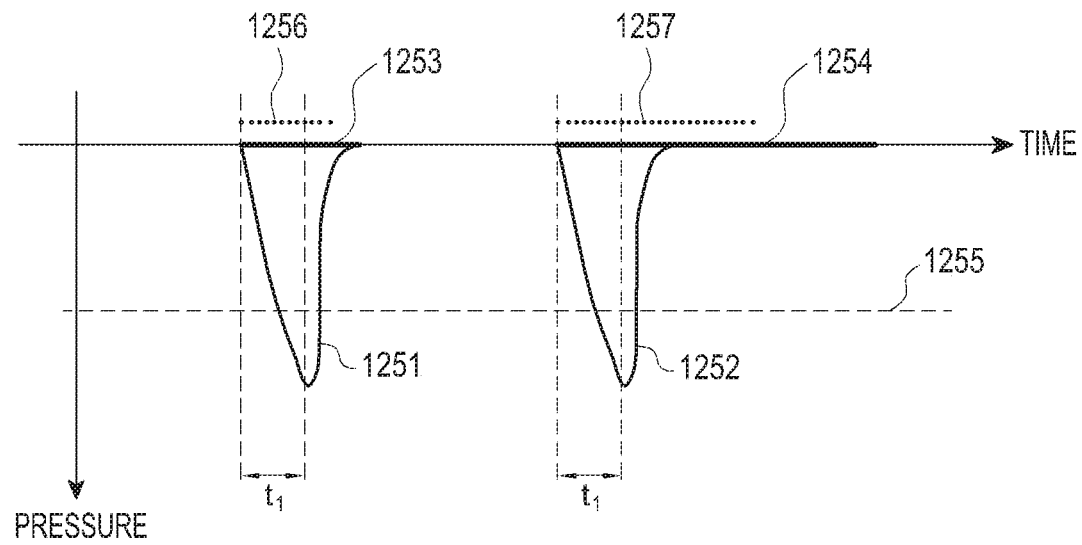

Referring to FIG. 12E, the electronic device 101 may sense a motion during a set time 1256 simultaneously with the input of the first touch input and the first pressure input 1251 by using a gyro sensor, etc. The user may input the first pressure input 1251 such that the pressure exceeds the first threshold value 1255 within the set time $t_1$, while shaking the electronic device 101 during the set time 1256 in a state where the electronic device 101 receives the first touch input as indicated by 1253, and then the electronic device 101 may determine the release of the first touch input and the first pressure input 1251. The first touch, the first pressure input 1251, and the motion of the electronic device 101 may occur at the same time, and the motion may be stopped prior to the release of the first touch. The user may input the second pressure input 1252 such that the pressure exceeds the first threshold value 1255 within the set time $t_1$, while shaking the electronic device 101 during a set time 1257 in a state where the electronic device 101 receives the second touch input as indicated by 1254, release the second pressure input 1252, and stop the motion of the electronic device 101 and release the second touch input. The electronic device 101 may sense such user input. The first threshold value 1255, the determined time $t_1$, the duration 1253 of the first touch input, the duration 1254 of the second touch input, and the set times 1256 and 1257 may be adjusted variably.

Figure 12F:
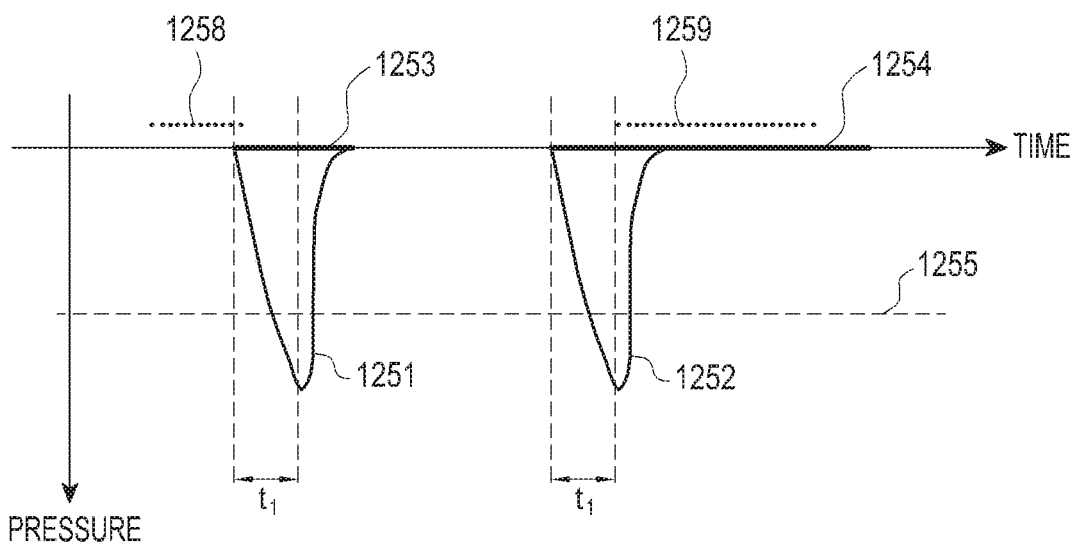

Referring to FIG. 12F, FIG. 12F is globally similar to FIG. 12E except for a point in time when a motion of an electronic device occurs. For example, after moving the electronic device 101 during a determined time 1258, the user may input the first touch input and the second pressure input 1251 at the same time. The user may move the electronic device 101 during a determined time 1259 after inputting the first touch input and the second pressure input 1252 at the same time. The electronic device 101 may sense such user input.

Figure 12G:
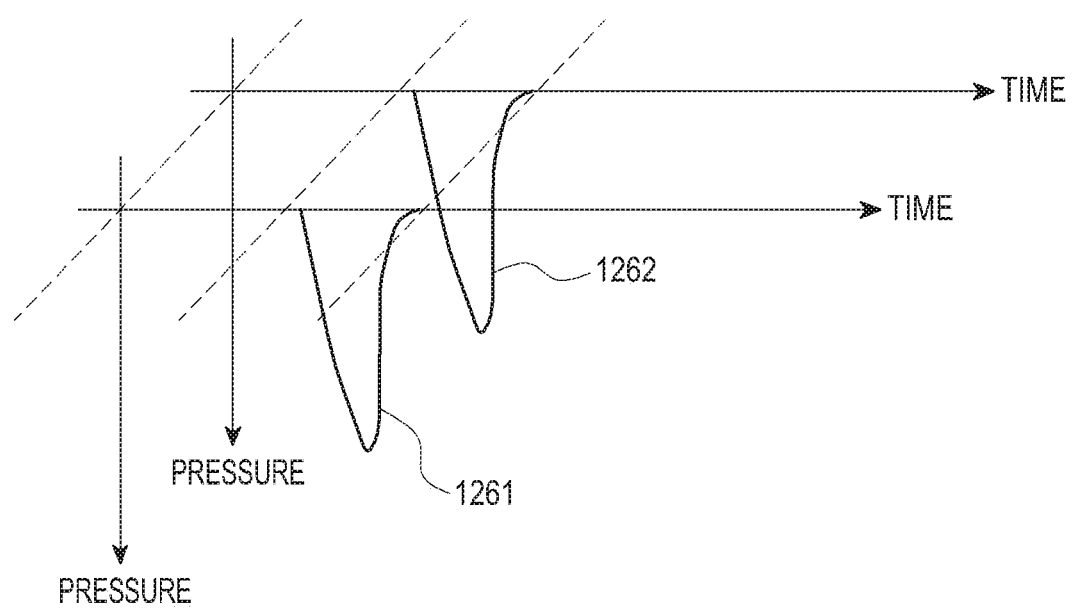

Referring to FIG. 12G, the user may input a multi-pressure input. The electronic device 101 may sense a plurality of pressure inputs 1261 and 1262 that are input onto the touch screen display 160 at the same time. The plurality of pressure inputs may be input from the user and thus may have a small time difference therebetween, but in this document, the inputs that are input with a small time difference therebetween will be regarded as being input at the same time. The electronic device 101 may sense a plurality of pressure inputs of the user.

As described with reference to FIGS. 12A through 12G, according to various embodiments of the present disclosure, various inputs for controlling the operation of the electronic device 101 may be received. In addition to various embodiments of the present disclosure, an input based on various conditions such as time, pressure, shake, etc., may be sensed and a function corresponding to sensing the input may be called.

Figure 13:
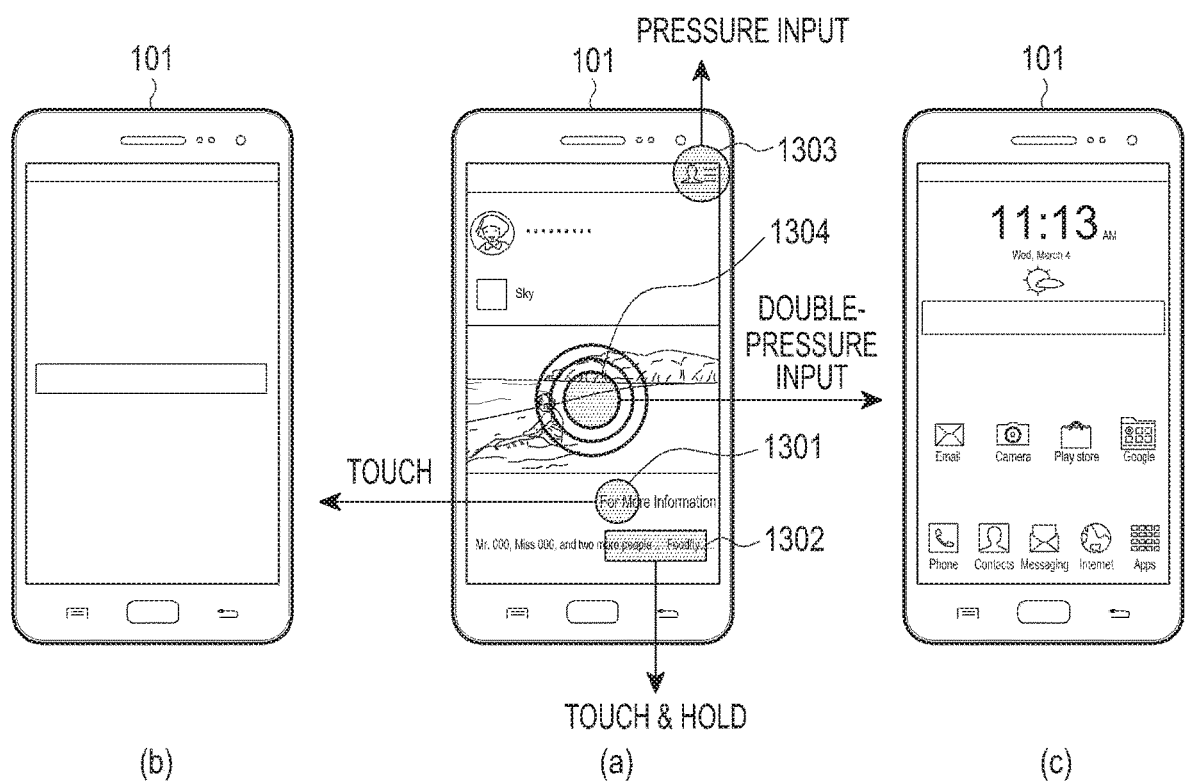
FIG. 13 illustrates an example for providing various inputs to an electronic device according to an embodiment of the present disclosure.

FIG. 13 illustrates an example for providing various inputs to an electronic device according to an embodiment of the present disclosure. (a) of FIG. 13 illustrates an electronic device prior to providing of an input according to an embodiment of the present disclosure, (b) of FIG. 13 illustrates a result when a touch input according to an embodiment of the present disclosure is input, and (c) of FIG. 13 illustrates a result when a double-pressure input according to an embodiment of the present disclosure is input.

Referring to (a) through (c) of FIG. 13, once the user inputs a touch input onto an item 1301 on a screen displayed on the touch screen display 160 of the electronic device 101, the electronic device 101 may display a detailed screen about the item 1301 as illustrated in (b) of FIG. 13. When the user inputs a touch & hold input onto another item 1302, the electronic device 101 may determine the touch & hold input as an input for selecting the other item 1302. When the user inputs a pressure input onto an item 1303, the electronic device 101 may display a sub-menu regarding the selected item 1303. Once the user inputs a double-pressure input onto a screen of the touch screen display 160 of the electronic device 101, the electronic device 101 may switch the current screen into a home screen as illustrated in (c) of FIG. 13.

Figure 14:
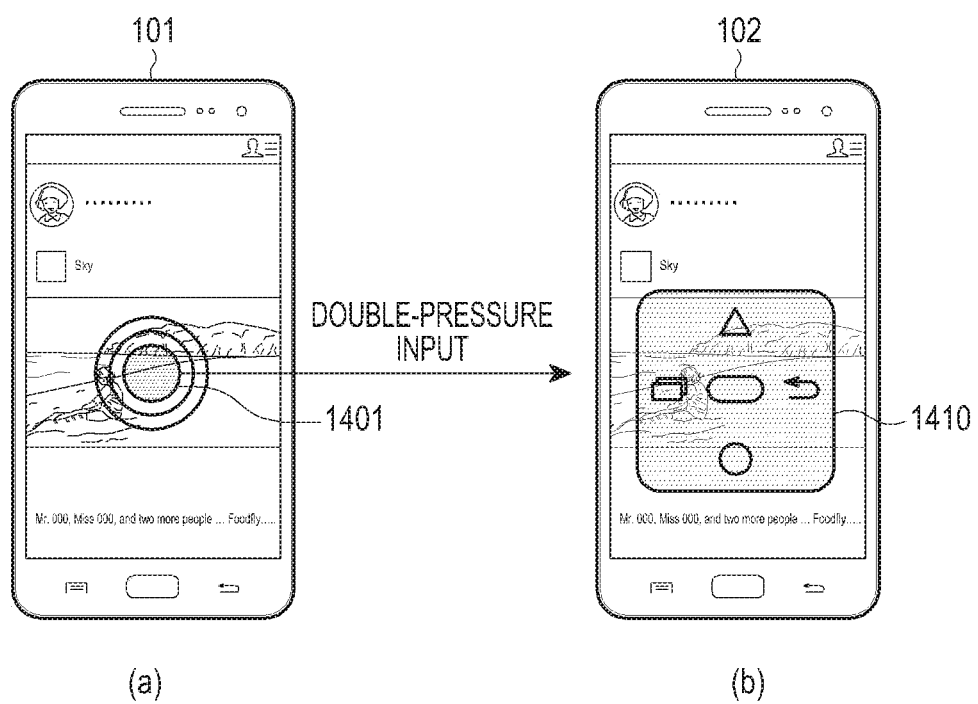
FIG. 14 illustrates an example for displaying a menu when a double pressure input is input according to an embodiment of the present disclosure.

FIG. 14 illustrates an example for displaying a menu when a double pressure input is input according to an embodiment of the present disclosure. (a) of FIG. 13 illustrates an electronic device before an input according to another embodiment of the present disclosure is provided, and (b) of FIG. 14 illustrates a menu.

Referring to (a) and (b) of FIG. 14, once the user inputs a double-pressure input 1401 onto a screen of the touch screen display 160 of the electronic device 101, the electronic device 101 may display a menu 1410 as a pop-up screen on the current screen as illustrated in (b) of FIG. 14. The menu 1410 may include different functions according to an application displayed on the touch screen display 160 and attributes of an item at a point where the double-pressure input is sensed.

According to various embodiments of the present disclosure, functions corresponding to at least one of or a combination of at least one of a pressure change rate and a touch duration before or after sensing the pressure may vary with a type and/or an item of an application, and an instruction for the functions may be stored in the memory 130.

For example, the memory 130 may store Table 1 showing functions corresponding to various inputs based on types of applications according to the present disclosure.

TABLE 1

| Application | Input | Execution Result |
|---|---|---|
| Widget | Pressure Input | Option or Menu Display |
| Gallery | Fast Pressure Input | Switch to Edit Mode |
| SMS | Pressure Input & Touch Hold | Display Particular Emoticon |
| Call Log | Fast Pressure Input & Touch Hold | Call Log Display |
| SNS | Double Fast Pressure Input | Menu Display |
| Application | Double Fast Pressure Input | Switch to Home Screen |
| Home Screen | Fast Pressure Input & Hold | Delete All Data Stored in Memory |

Table 1 is merely an example, and the present disclosure may be applied to an application, an input, and an execution result as well as those included in Table 1.

As used herein, the term "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the present disclosure may include at least one of an application-specific integrated circuit (ASIC) chip, field-programmable gate arrays (FPGAs), and a programmable-logic device performing certain operations already known or to be developed.

At least a part of a device (e.g., modules or functions thereof) or a method (e.g., operations) according to various embodiments may be implemented with a command stored in a computer-readable storage medium in the form of a programming module. When the instructions are executed by a control circuit, the control circuit may perform functions corresponding to the instructions. The computer-readable storage medium may be, for example, a memory included in the memory 130. At least a part of the programming module may be implemented (for example, executed) by the control circuit At least some of the programming modules may include, for example, modules, programs, routines, sets of instructions, or processes for performing one or more functions.

The computer readable recording medium includes magnetic optical Media such as compact disc read only memory (CD-ROM) or digital versatile disc (DVD), magneto-optical media such as floptical disk, and a hardware device such as ROM, RAM, flash memory storing and executing program commands. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to the present disclosure may include one or more of the foregoing elements, have some of the foregoing elements omitted, or further include additional other elements. Operations performed by the modules, the programming modules or other elements according to the present disclosure may be executed in a sequential, parallel, repetitive or heuristic manner. Also, some of the operations may be executed in different order or omitted, or may have additional different operations. According to various embodiments, in a computer-readable storage medium having stored therein instructions, the instructions may include a first instruction set for receiving from the pressure sensor, data indicating pressure by a user or an external object to the touch screen display, a second instruction set for determining a pressure change rate indicating a change of the pressure per unit time, and a third instruction set for calling a function based on at least a part of at least one of a value of the pressure or the pressure change rate.

The embodiments of the present disclosure disclosed in the present specification and drawings have been provided to easily describe the present disclosure and to help understanding of the present disclosure, and are not intended to limit the scope of the present disclosure. Therefore, it should be construed that the scope of the present disclosure includes any change or other various embodiments based on the technical spirit of the present disclosure as well as the embodiments described herein.

The invention claimed is:

1. An electronic device comprising:
a housing comprising a first surface directed in a first direction and a second surface directed in a second direction that is opposite to the first direction;
a touch screen display located between the first surface and the second surface, and exposed through the first surface;
a pressure sensor located between the first surface and the second surface and configured to sense at least one pressure by an external object to the touch screen display;
at least one processor electrically connected with the touch screen display and the pressure sensor; and
a memory electrically connected with the at least one processor,
wherein the memory stores instructions that cause, when executed, the at least one processor to:
receive, from the pressure sensor, data indicating pressure by a user or the external object to the touch screen display,
determine a pressure change rate indicating a change of the pressure per unit time based on the data, and
call a function based on a value of the pressure and the pressure change rate, and
wherein the instructions cause the at least one processor when calling the function to:
call a first function when the value of the pressure exceeds a first threshold value, and
call a second function when the value of the pressure does not exceed the first threshold value and the pressure change rate exceeds a second threshold value.

2. The electronic device of claim 1, further comprising at least one of a touch panel configured to detect a hovering or a touch input by the external object, a gyro sensor configured to detect motion of the electronic device, or a motion recognition sensor of a camera.

3. The electronic device of claim 1,
wherein the instructions cause the at least one processor to measure the pressure change rate, and
wherein the pressure change rate is measured based on time when the pressure is sensed and time when the pressure is released.

4. The electronic device of claim 1, wherein the instructions cause the at least one processor to identify an input using the pressure by converting the pressure change rate into speed.

5. The electronic device of claim 1, wherein the instructions cause the at least one processor to call a function corresponding to at least one of or a combination of at least one of the pressure change rate, or a touch duration before or after the sensing of the pressure.

6. The electronic device of claim 5, wherein the instructions cause the at least one processor to apply a motion change amount of the electronic device sensed by at least one of an acceleration sensor or a gyro sensor to call the function.

7. The electronic device of claim 5, wherein the memory comprises an instruction for a function called corresponding to at least one of or a combination of at least one of the pressure change rate, or a touch duration before or after the sensing of the pressure.

8. The electronic device of claim 1, wherein when two pressures are sensed, the at least one processor is further configured, by executing the instructions, to call a function corresponding to the sensed two pressures.

9. The electronic device of claim 1, wherein the called function differs according to a type of an application displayed on the touch screen display.

10. A control method of an electronic device comprising a touch screen display and a pressure sensor, the control method comprising:
receiving, from the pressure sensor, data indicating pressure by a user or an external object to the touch screen display;
determining a pressure change rate indicating a change of the pressure per unit time based on the data; and
calling a function based on a value of the pressure and the pressure change rate,
wherein the calling of the function comprises:
calling a first function when the value of the pressure exceeds a first threshold value, and
calling a second function when the value of the pressure does not exceed the first threshold value and the pressure change rate exceeds a second threshold value.

11. The control method of claim 10, wherein the receiving of the data comprises at least one of:
detecting a hovering or a touch input by the external object;
detecting a gesture input by the external object;
detecting motion of the electronic device; or
recognizing motion by using a camera included in the electronic device.

12. The control method of claim 10, further comprising measuring the pressure change rate, wherein the pressure change rate is measured based on time when the pressure is sensed and time when the pressure is released.

13. The control method of claim 10, further comprising identifying an input using the pressure by converting the pressure change rate into speed.

* * * * *